Oct. 17, 1950  R. SOMMA  2,526,513
AUTOMATIC PHONOGRAPH
Filed March 28, 1946  19 Sheets-Sheet 1

INVENTOR
RAYMOND SOMMA
By
Seymour, Earle & Nichols
ATTORNEYS

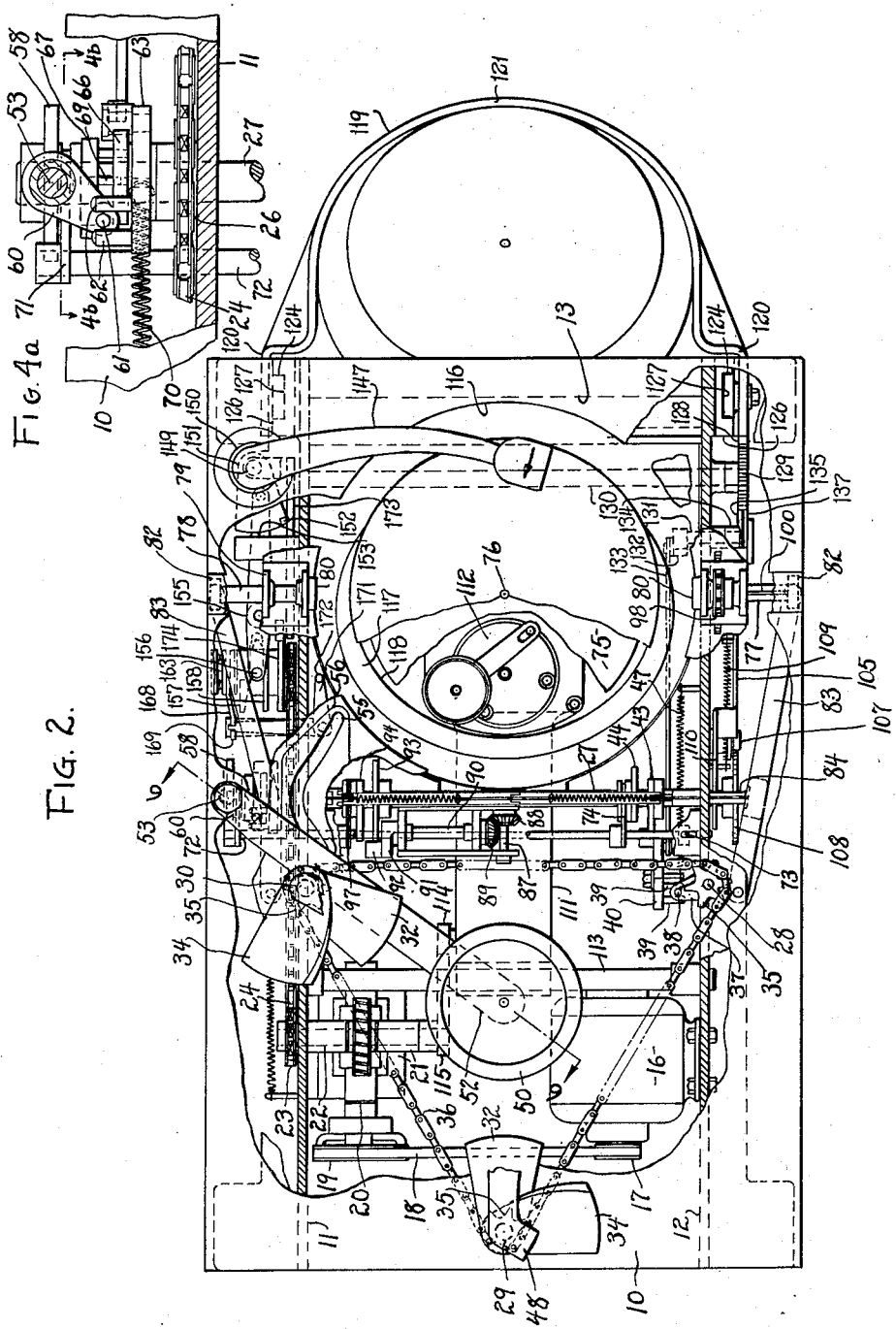

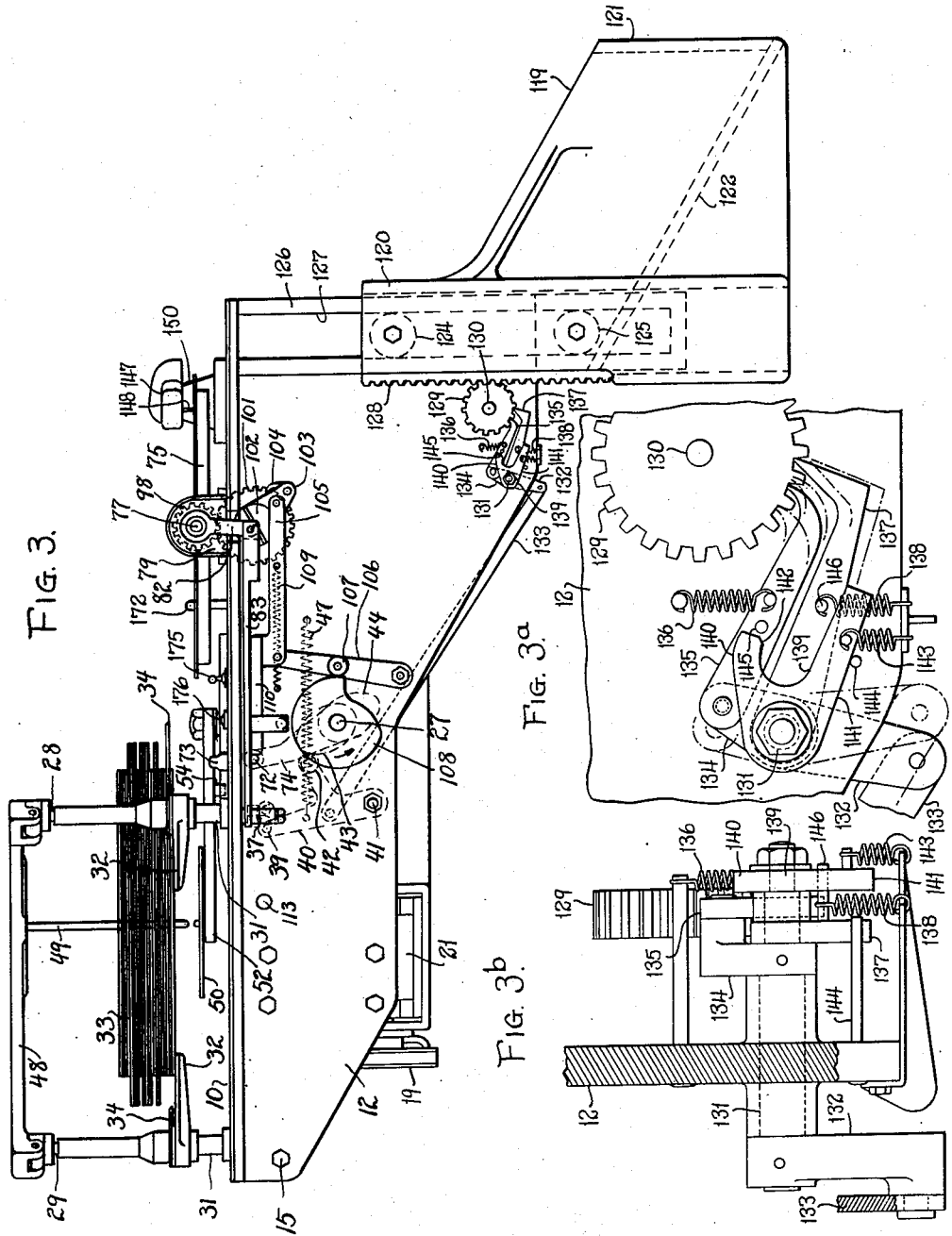

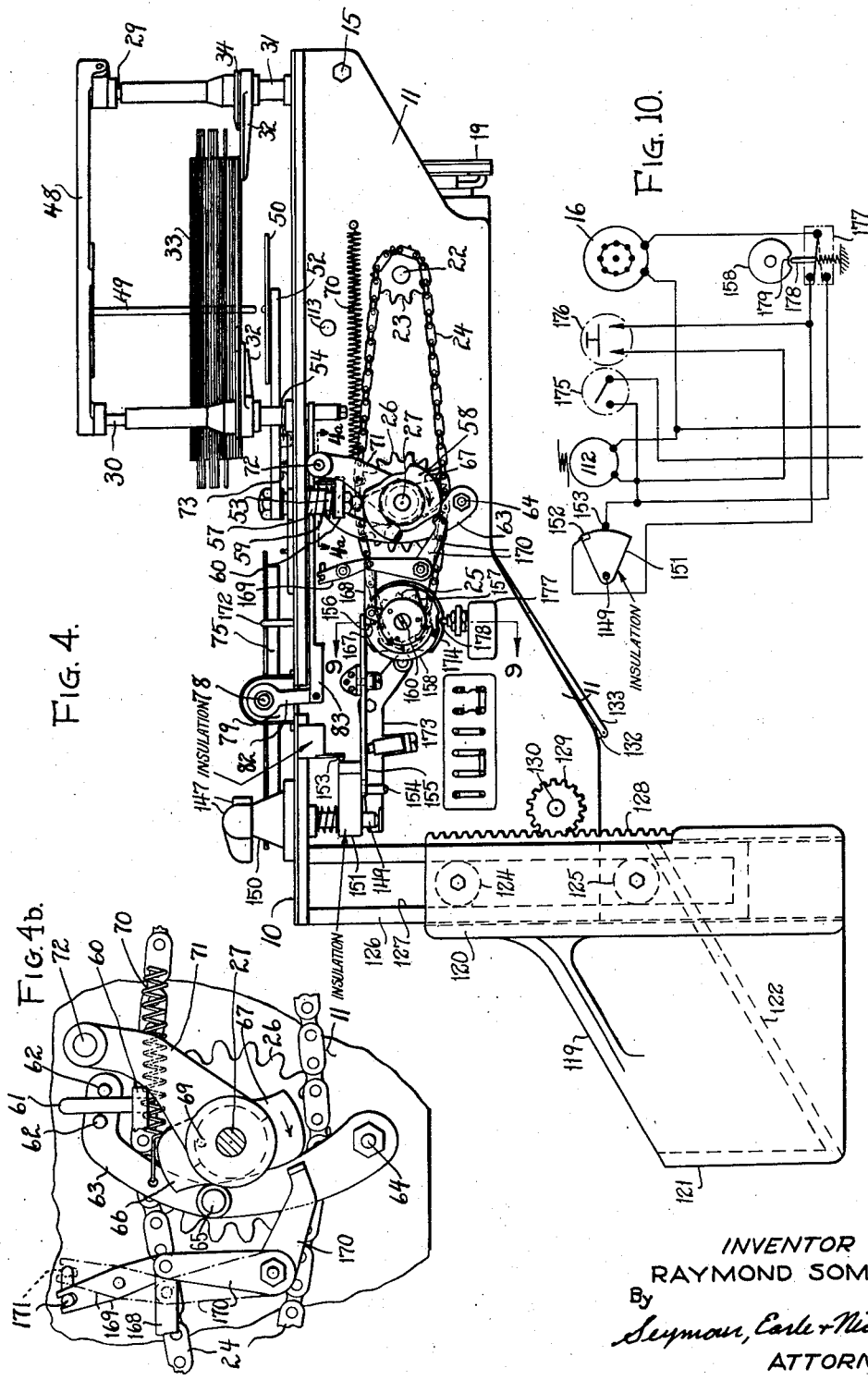

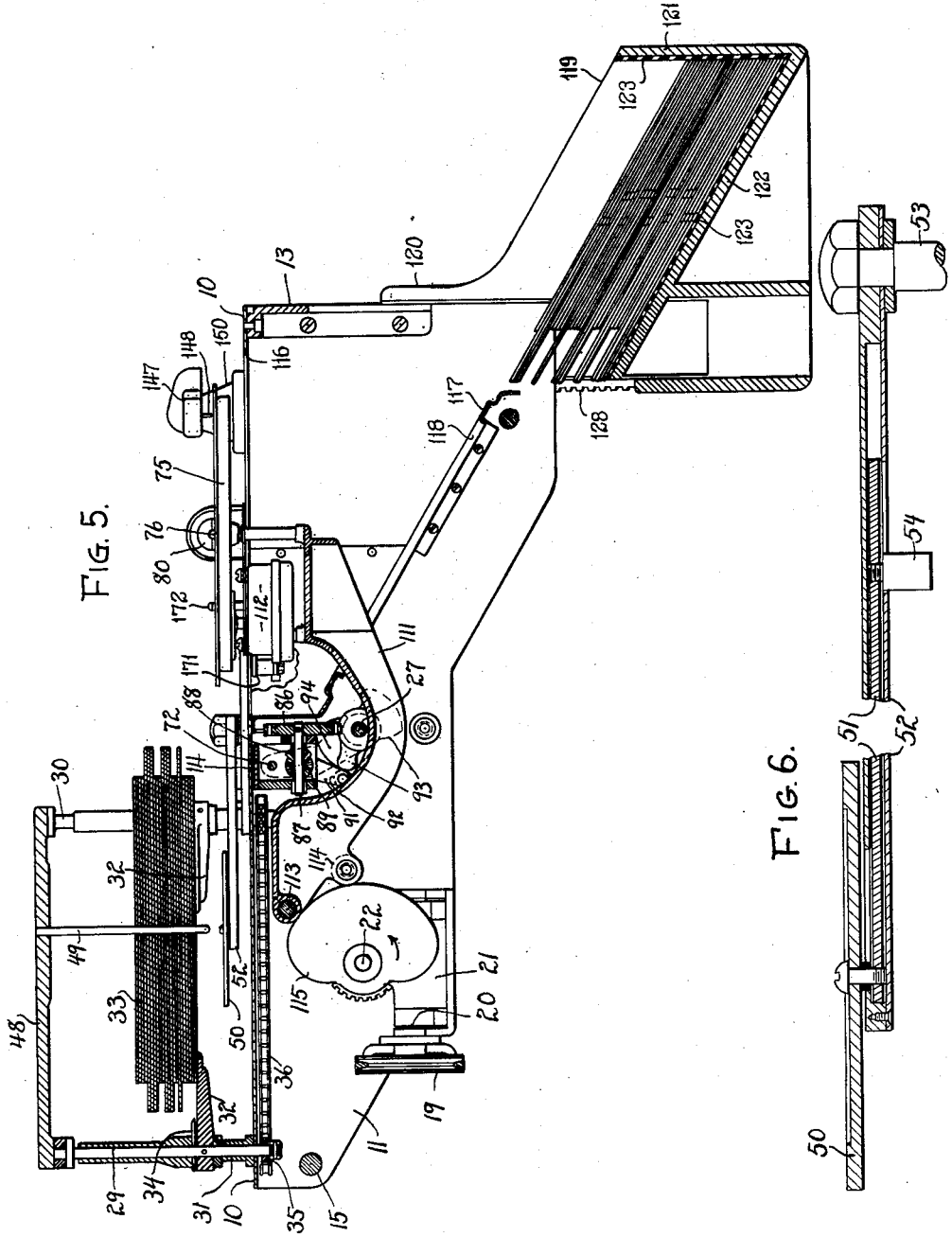
Oct. 17, 1950 — R. SOMMA — 2,526,513
AUTOMATIC PHONOGRAPH
Filed March 28, 1946 — 19 Sheets-Sheet 5
INVENTOR
RAYMOND SOMMA
By
Seymour, Earle & Nichols
ATTORNEYS Oct. 17, 1950  R. SOMMA  2,526,513
AUTOMATIC PHONOGRAPH
Filed March 28, 1946  19 Sheets-Sheet 6
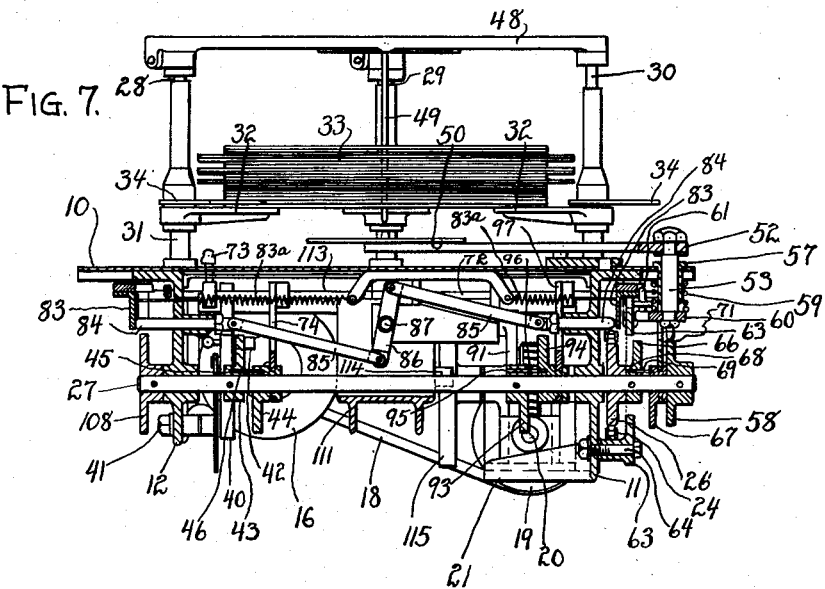
INVENTOR
RAYMOND SOMMA
By
Seymour, Carter & Nichols
ATTORNEYS Oct. 17, 1950 — R. SOMMA — 2,526,513
AUTOMATIC PHONOGRAPH
Filed March 28, 1946 — 19 Sheets-Sheet 7
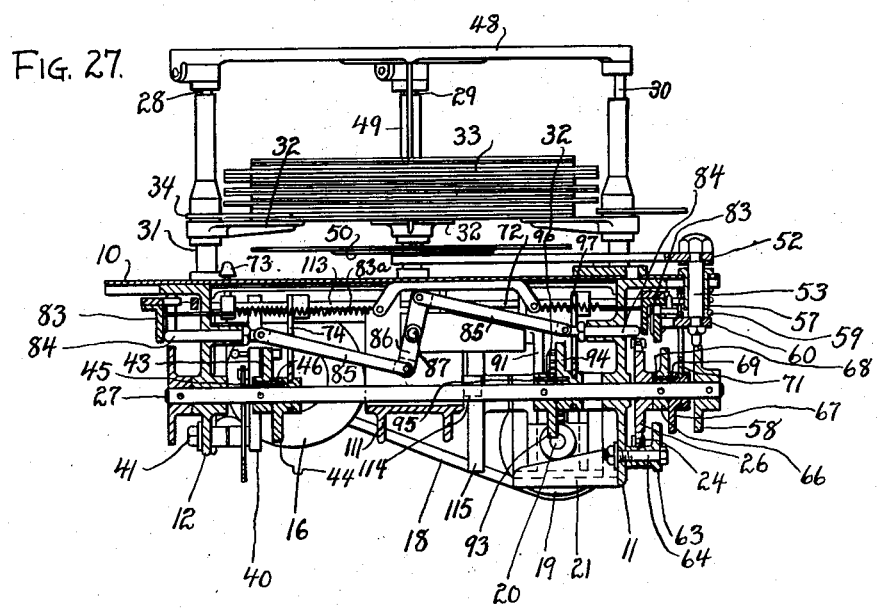
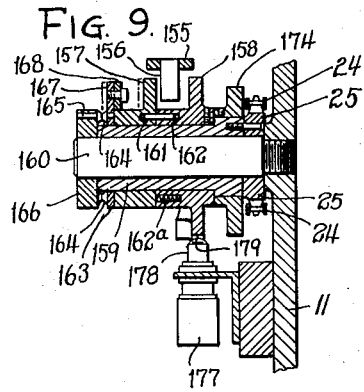
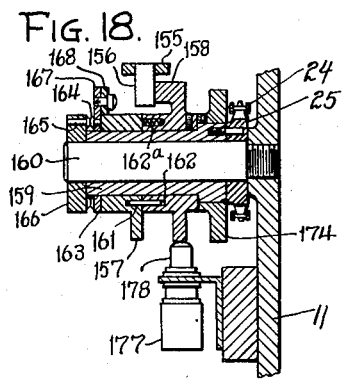
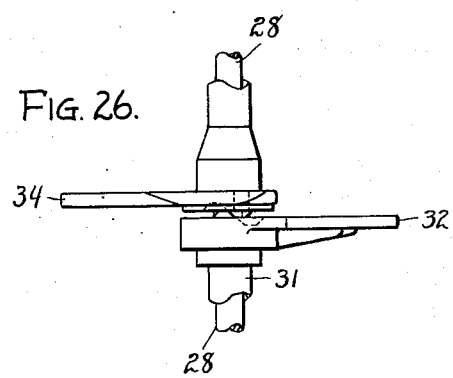
INVENTOR
RAYMOND SOMMA
By Seymour, Earle & Nichols
ATTORNEYS

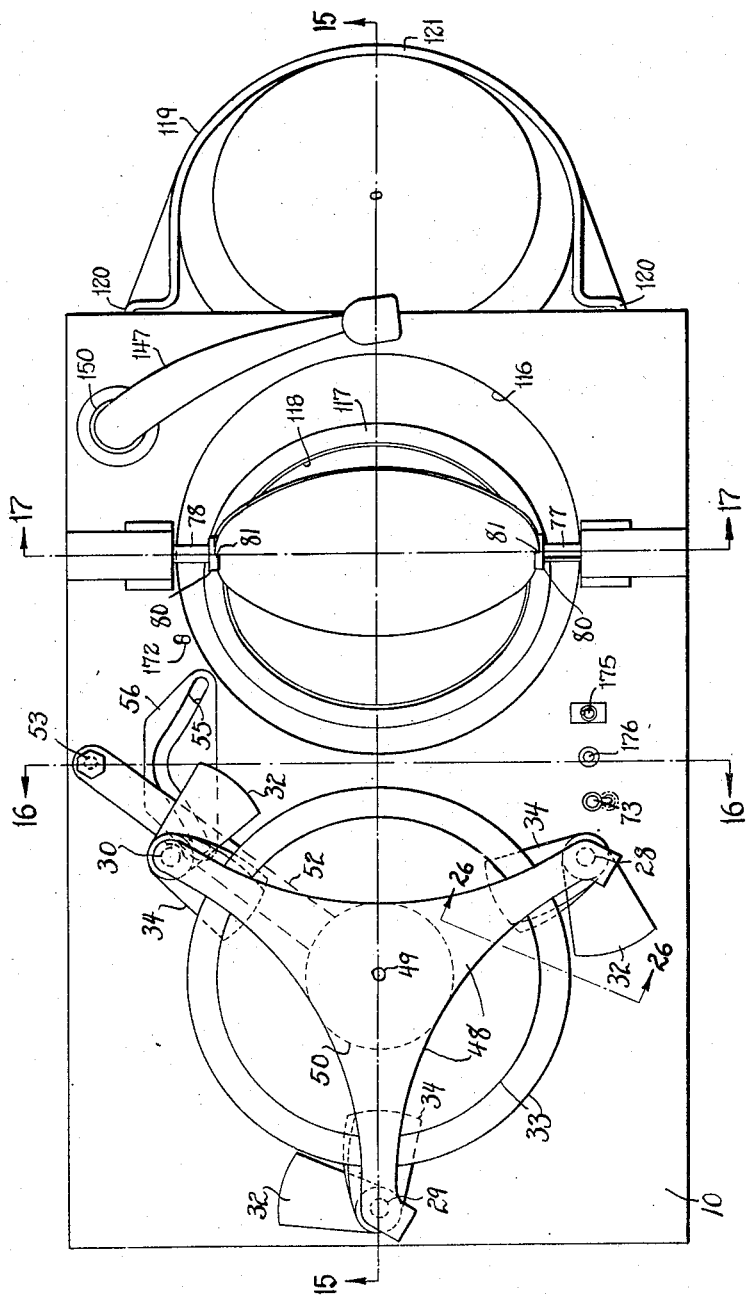

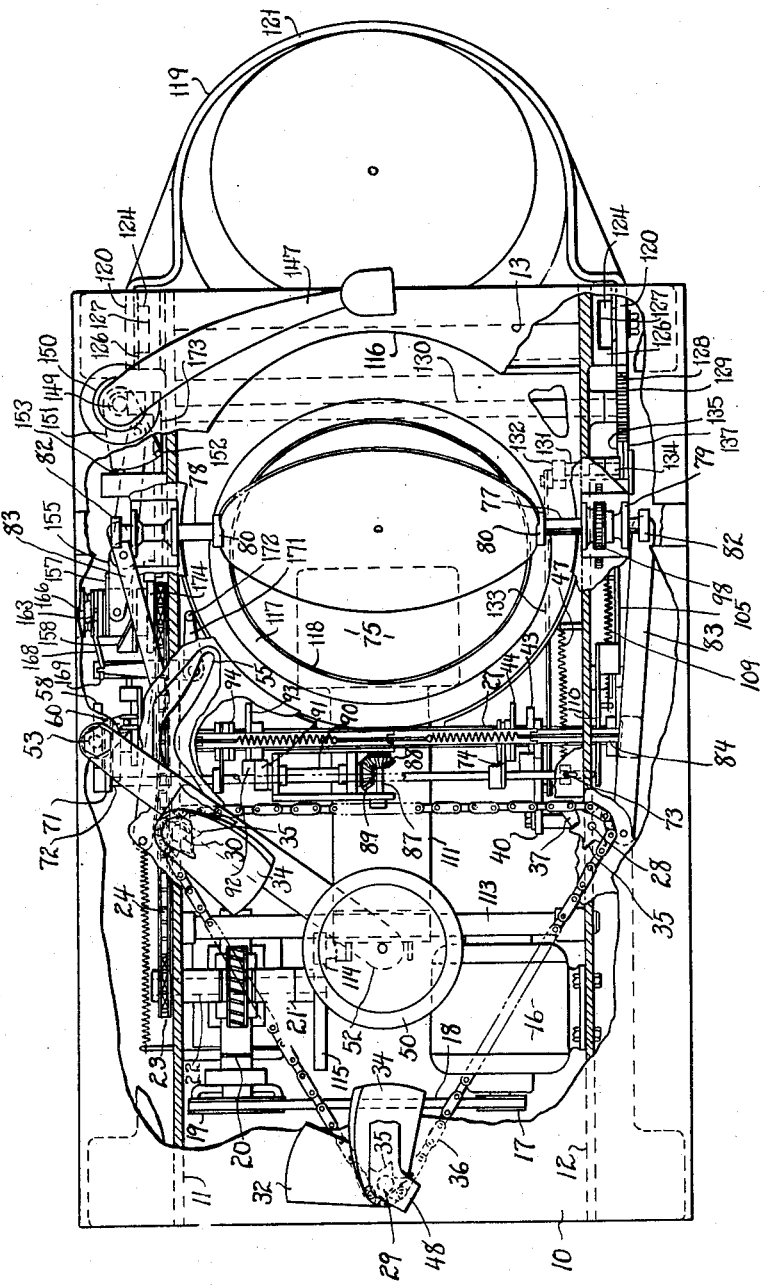

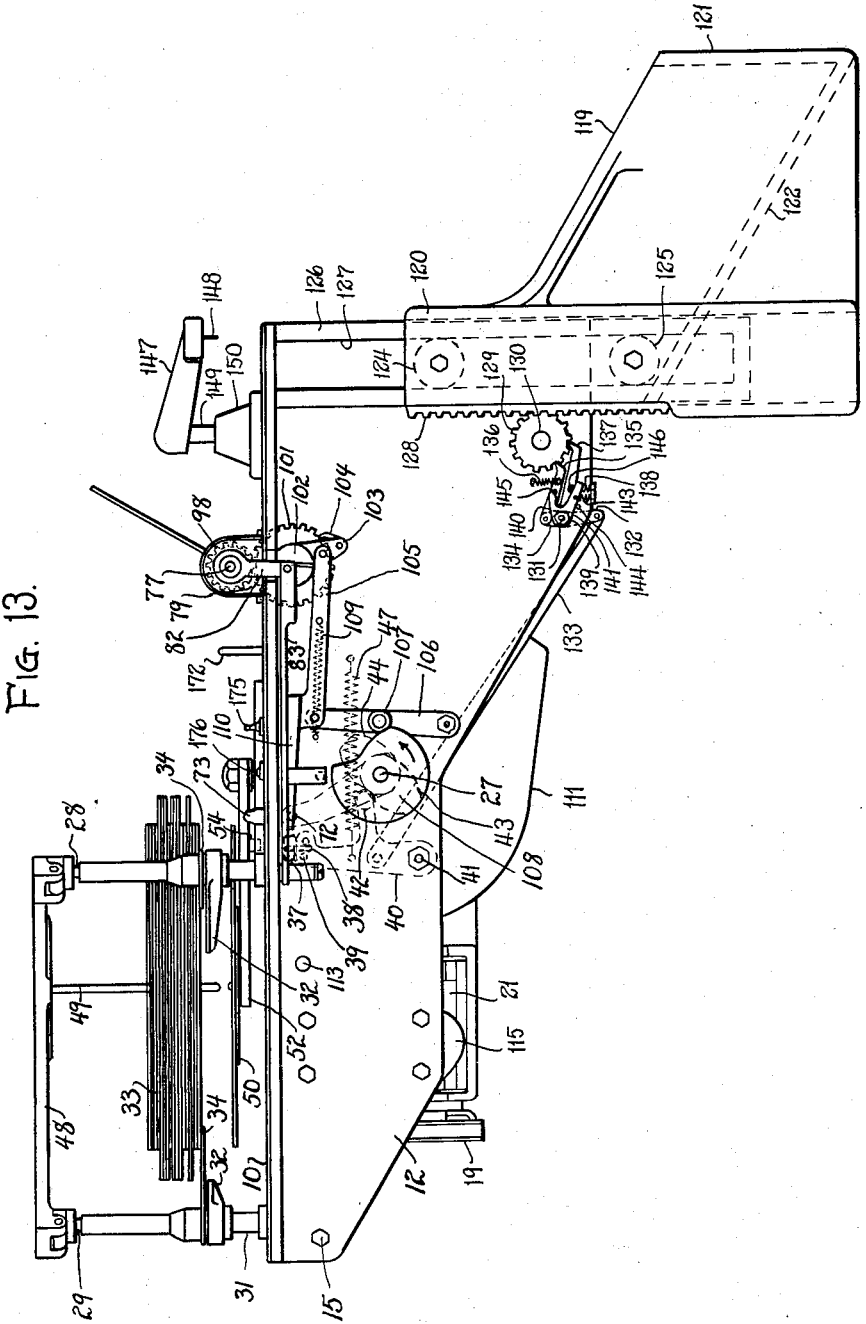

Oct. 17, 1950     R. SOMMA     2,526,513
AUTOMATIC PHONOGRAPH

Filed March 28, 1946     19 Sheets-Sheet 12

INVENTOR
RAYMOND SOMMA
By *Seymour, Earle & Nichols*
ATTORNEYS

Oct. 17, 1950

R. SOMMA 2,526,513

AUTOMATIC PHONOGRAPH

Filed March 28, 1946

INVENTOR
RAYMOND SOMMA
By
Seymour, Earle & Nichols
ATTORNEYS

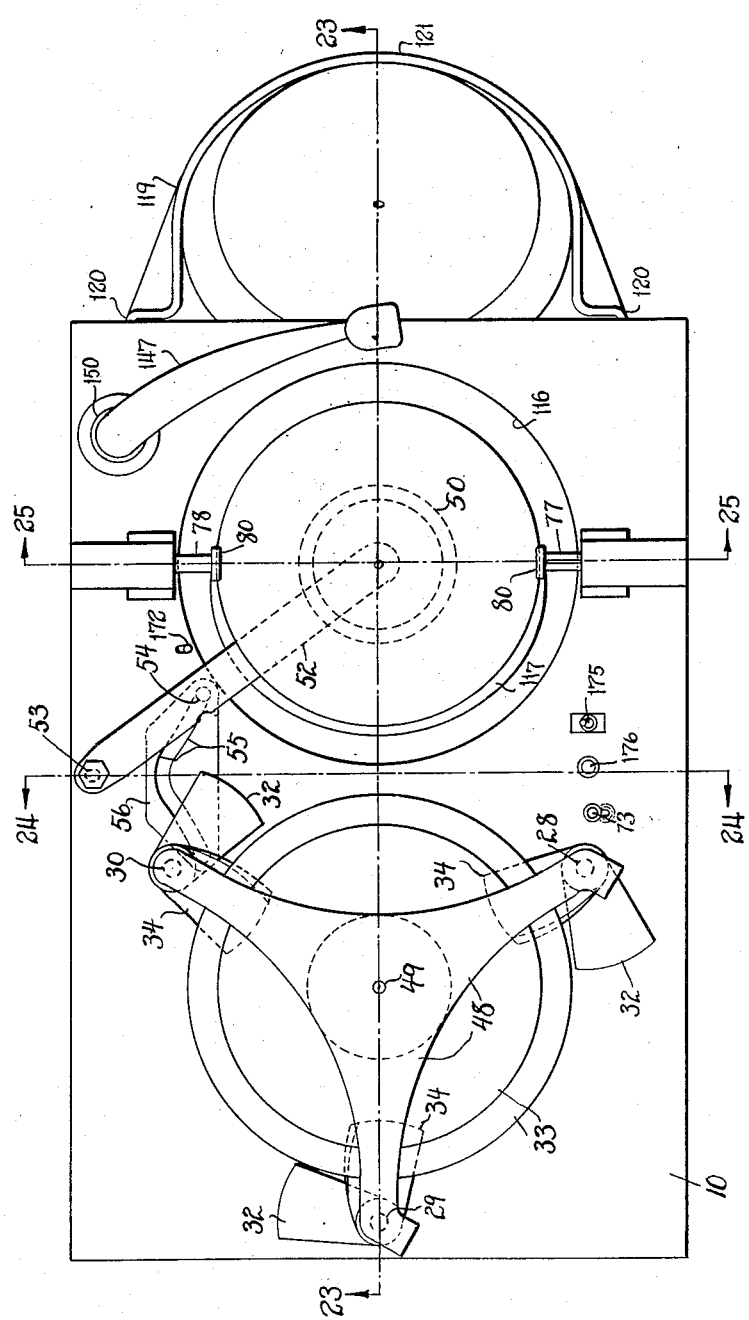

Oct. 17, 1950 R. SOMMA 2,526,513
AUTOMATIC PHONOGRAPH
Filed March 28, 1946 19 Sheets-Sheet 15

INVENTOR
RAYMOND SOMMA
By Seymour, Earle + Nichols
ATTORNEYS

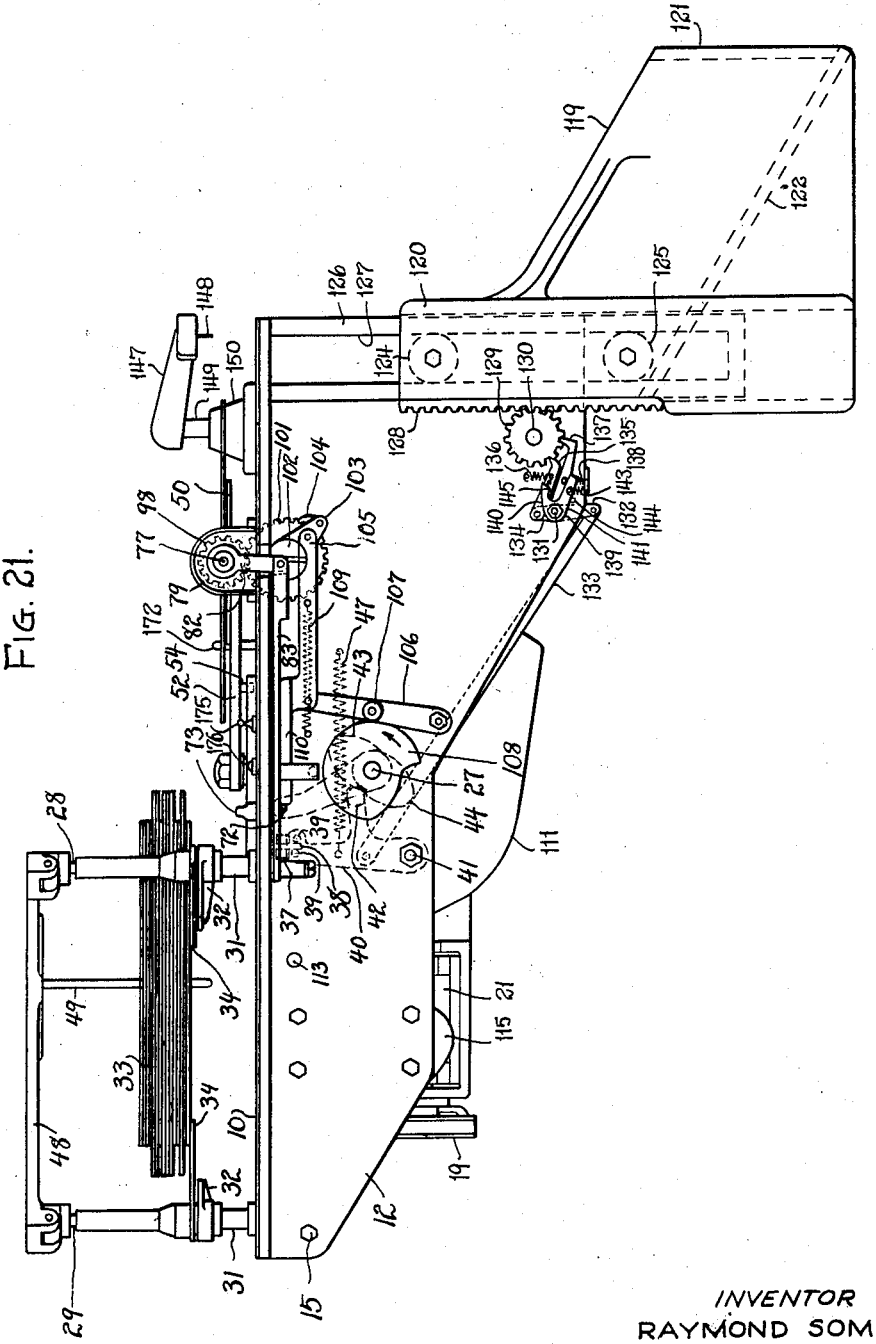

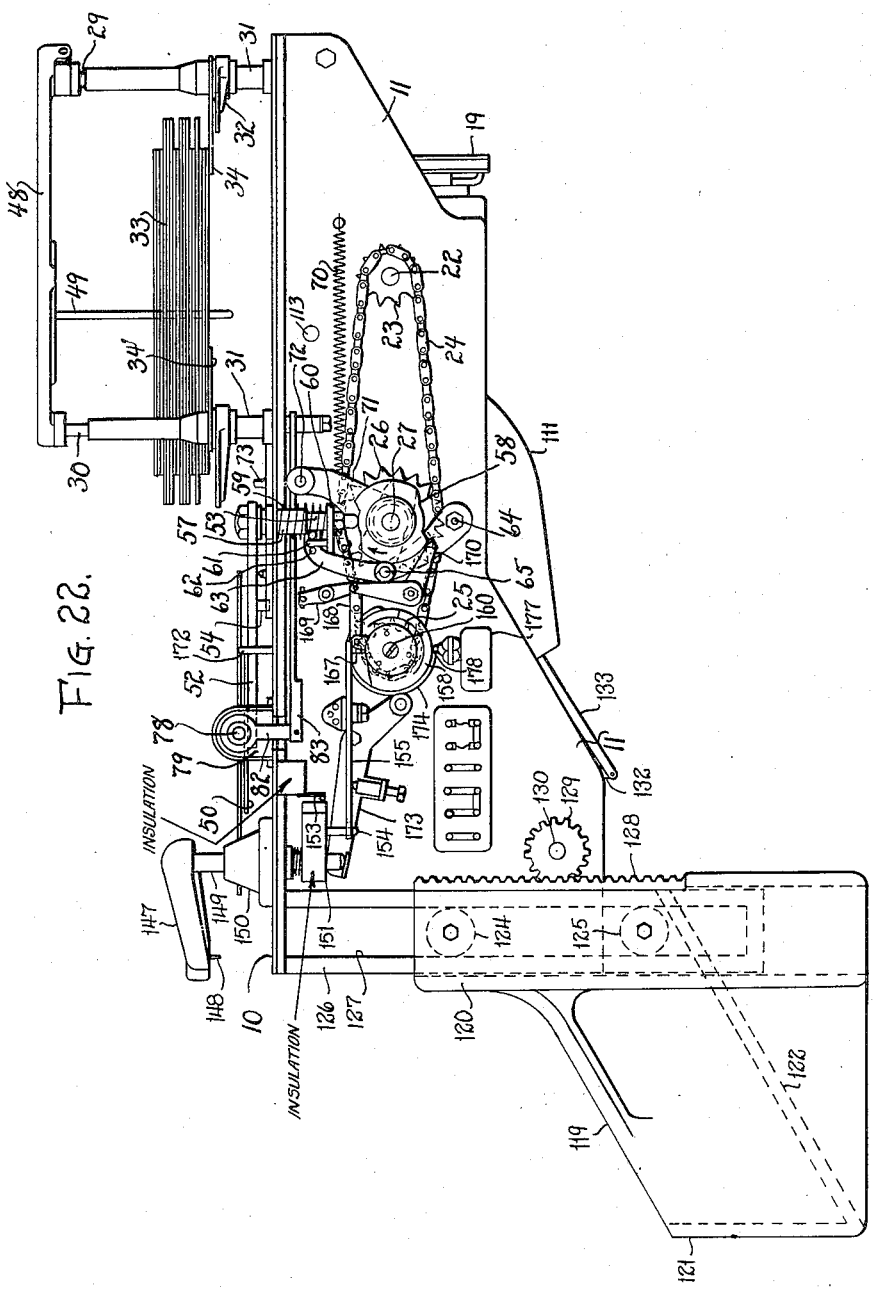

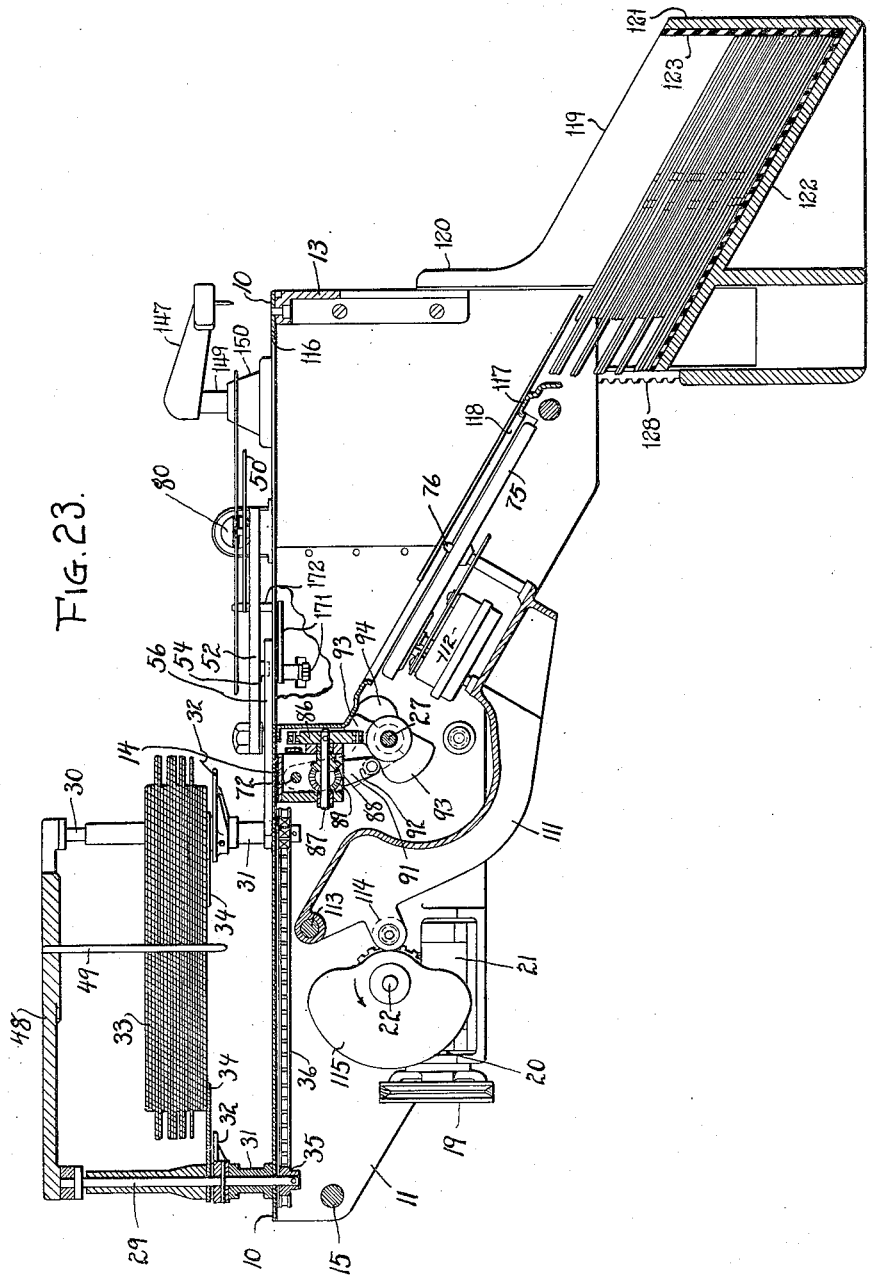

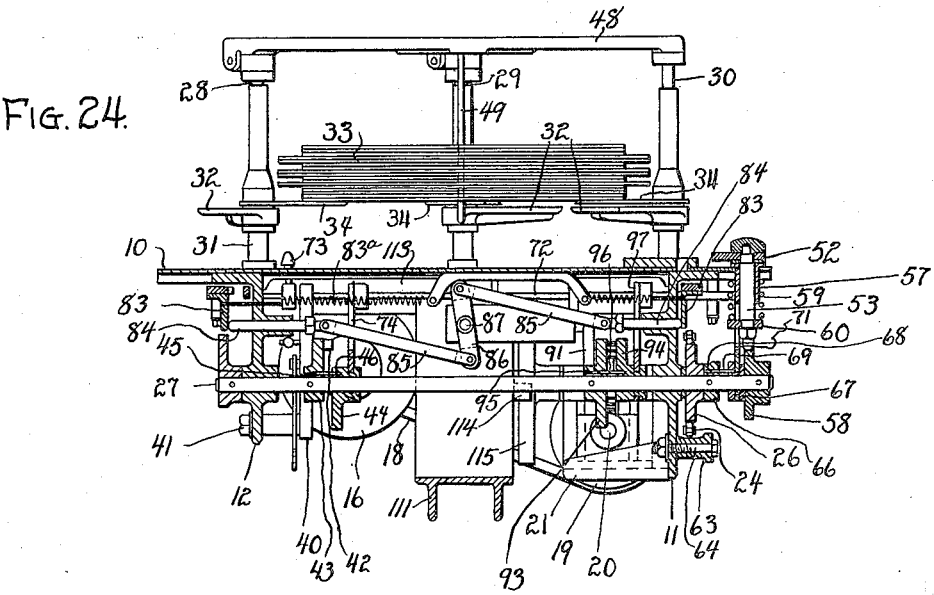

Patented Oct. 17, 1950

2,526,513

UNITED STATES PATENT OFFICE 2,526,513

AUTOMATIC PHONOGRAPH

Raymond Somma, Waterbury, Conn.

Application March 28, 1946, Serial No. 657,849

3 Claims. (Cl. 274—10)

The present invention relates to improvements in phonographs and relates more particularly to improvements in automatic phonographs, i. e., phonographs which will automatically shift from one recording surface to another.

One of the main objects of the present invention is to provide an automatic phonograph with a superior construction and arrangement of parts whereby the change from one recording surface to another is effected with minimum lapse of time.

Another object of the present invention is to provide a superior phonograph of the character referred to whereby possible injury to the records is minimized.

A further object of the present invention is to provide an automatic phonograph having a superior construction and arrangement of parts whereby records of different diameters may be automatically played in any desired sequence without requiring manual adjustment of the mechanism.

Still another object of the present invention is to provide a phonograph of the character referred to having a superior construction and arrangement of parts whereby when it is desired to reverse a given record to play its opposite face, such reversal may be made substantially at the playing location to thereby avoid undue movement with consequent loss of time and possible damage to the record.

A still further object of the present invention is to provide an automatic phonograph having a superior construction and arrangement of parts whereby records may be removed from the turntable without violent and damaging shock.

Another object of the present invention is to provide an automatic phonograph having a superior construction and arrangement of parts whereby records which have been played may be shifted from the turntable into a container without violent dropping.

A further object is to provide a phonograph of the character referred to having a superior construction and arrangement of parts whereby the maximum number of records-to-be-played may be held in position for ready transfer to a turntable.

Still another object of the present invention is to provide an automatic phonograph having a superior construction and arrangement of parts whereby the user may selectively provide for the playing of but one face of a plurality of records in sequence, or provide for the playing of each of two opposite faces of a given record in sequence followed by the similar playing of additional records.

A further object is to provide a superior automatic phonograph having simple, reliable and effective means whereby the user may in the midst of the playing of a given recording surface cause the phonograph to either discard the record or turn the same over for playing the reverse side thereof.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 2 is a view similar to Fig. 1 but with portions of the top of the chassis, turntable and associated parts broken away to expose the mechanism;

Fig. 3 is a view in front elevation of the mechanism of the preceding figures;

Fig. 3a is a broken view in front elevation of the automatic lowering-mechanism for the record-receiving magazine;

Fig. 3b is an edge view of the showing of Fig. 3a;

Fig. 4 is a view in rear elevation of the showing of the preceding figures;

Fig. 4a is a broken detail sectional view taken on the line 4a—4a of Fig. 4, but on a larger scale;

Fig. 4b is a broken sectional view but taken on the line 4b—4b of Fig. 4a;

Fig. 5 is a view mainly in central longitudinal section taken on the line 5—5 of Fig. 1 and partly in elevation;

Fig. 6 is a broken detailed sectional view of the record-transporting arm and associated parts taken on the line 6—6 of Fig. 2;

Fig. 7 is a transverse sectional view taken on the line 7—7 of Fig. 1;

Fig. 8 is a similar view but taken on the line 8—8 of Fig. 1;

Fig. 9 is a broken detail sectional view taken on the line 9—9 of Fig. 4;

Fig. 10 is a diagrammatic showing of the electrical system of the automatic phonograph;

Fig. 11 is a top or plan view similar to Fig. 1 but showing the parts in the positions which they assume after the completion of the playing of the first face of the small record illustrated in the preceding figures and during the reversal of the said record preparatory to the playing of its second face;

Fig. 12 is a view similar to Fig. 2 but showing the parts in the positions of Fig. 11;

Fig. 13 is a front elevational view similar to Fig. 3 but showing the parts in the positions illustrated in Figs. 11 and 12;

Fig. 18 is a broken detail sectional view similar to Fig. 9 but taken on the line 18—18 of Fig. 14;

Figure 1:
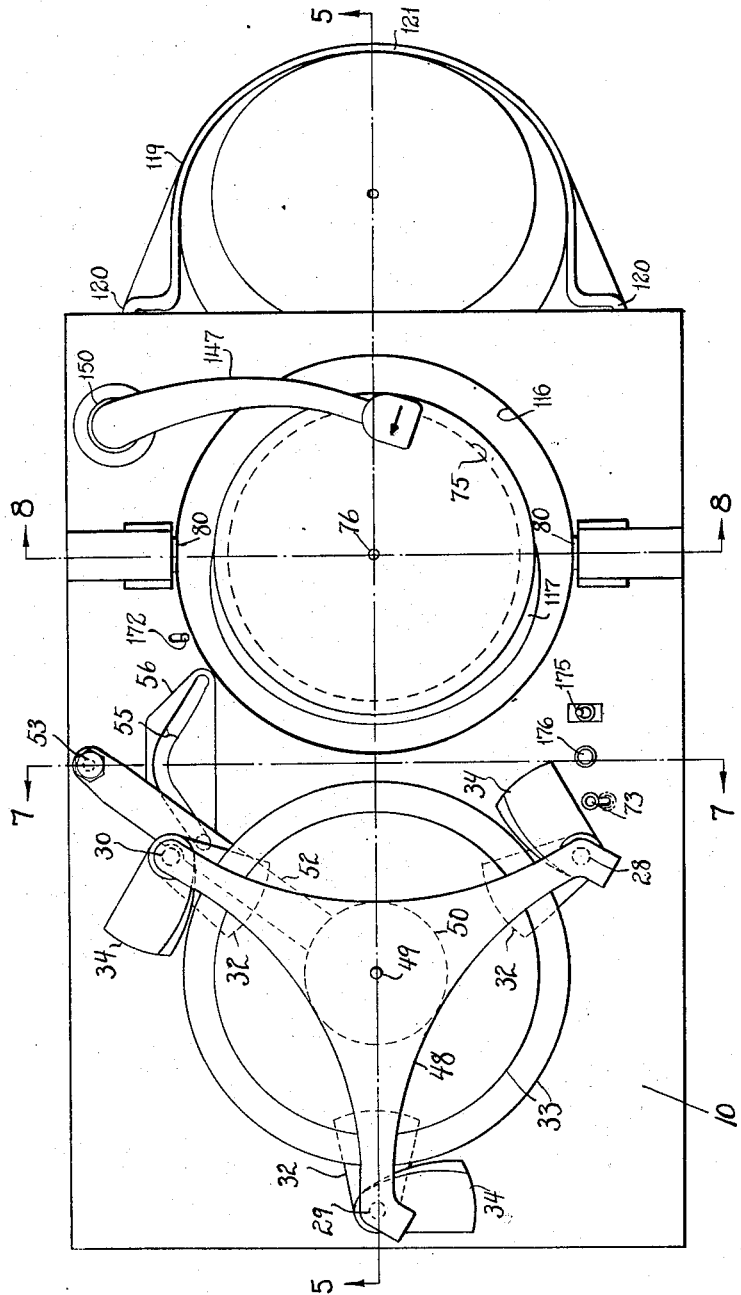
Fig. 1 is a top or plan view of one form of automatic phonograph constructed in accordance with the present invention and showing the parts in the positions which they assume during the playing of the first side of a small-diametered record, to be followed by the turning over and playing of the said record.
Figure 14:
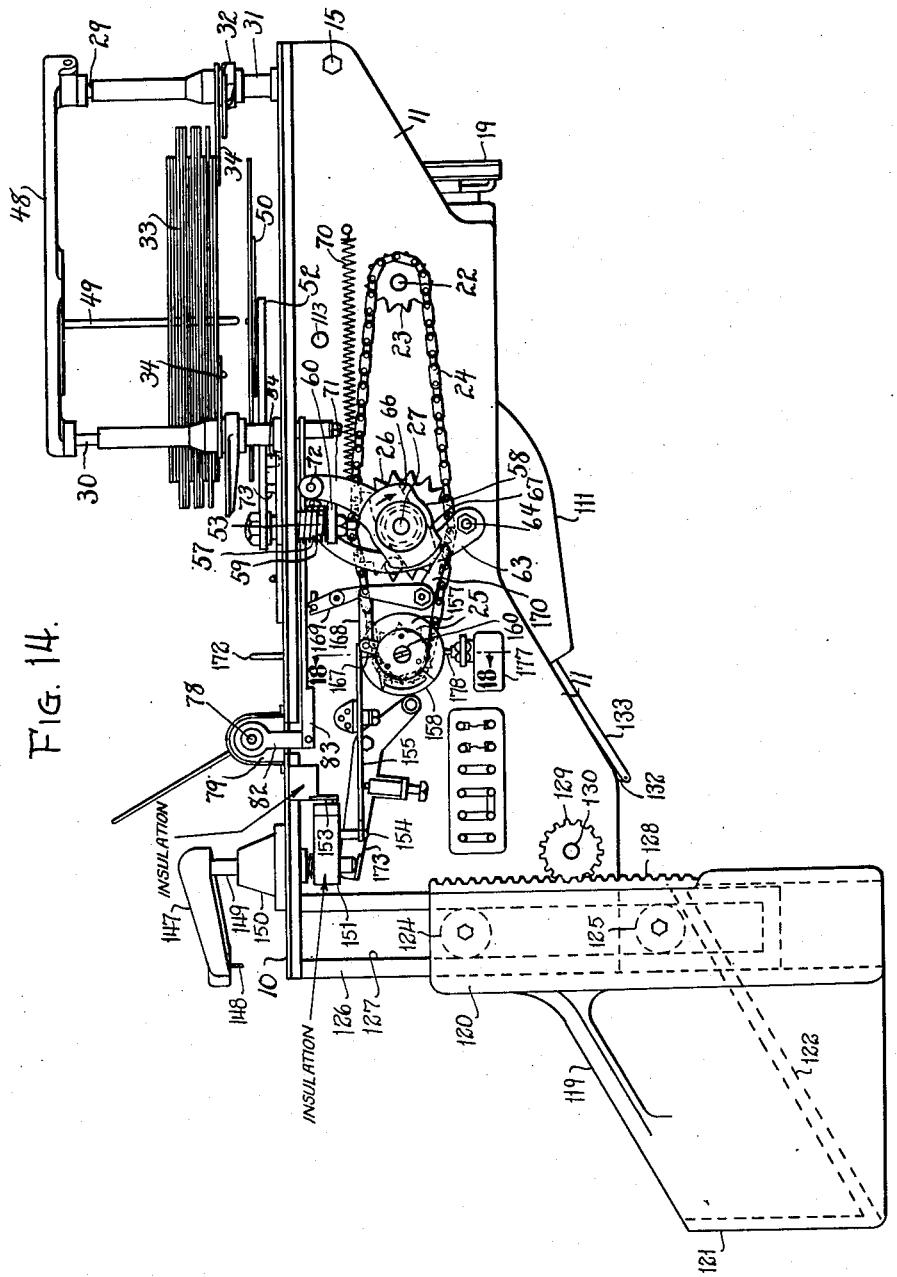
Fig. 14 is a rear elevational view similar to Fig. 4 but showing the parts in the positions illustrated in Figs. 11 to 13 inclusive.
Figure 15:
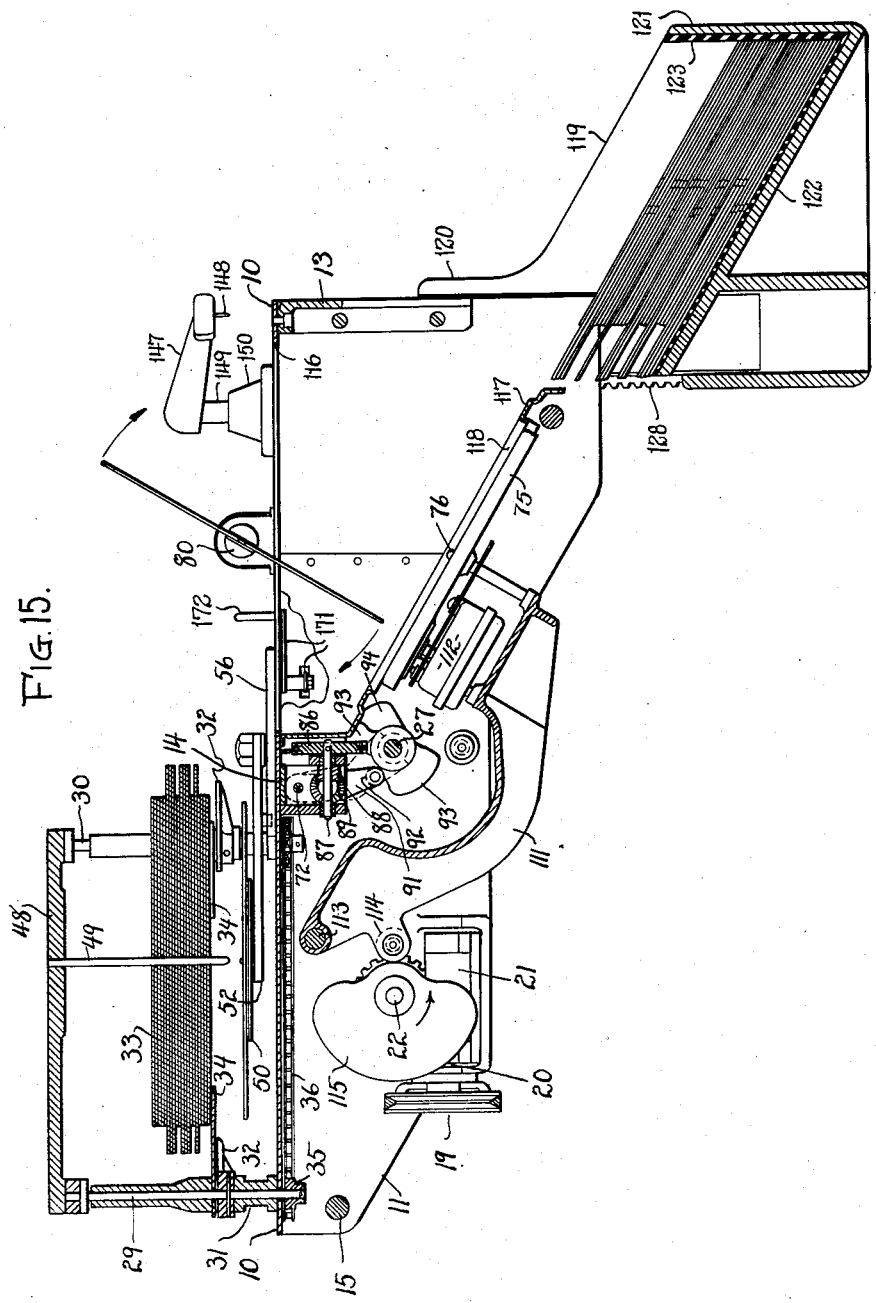
Fig. 15 is a part sectional and part elevational view similar to Fig. 5 but taken on the line 15—15 of Fig. 11.
Figure 16:
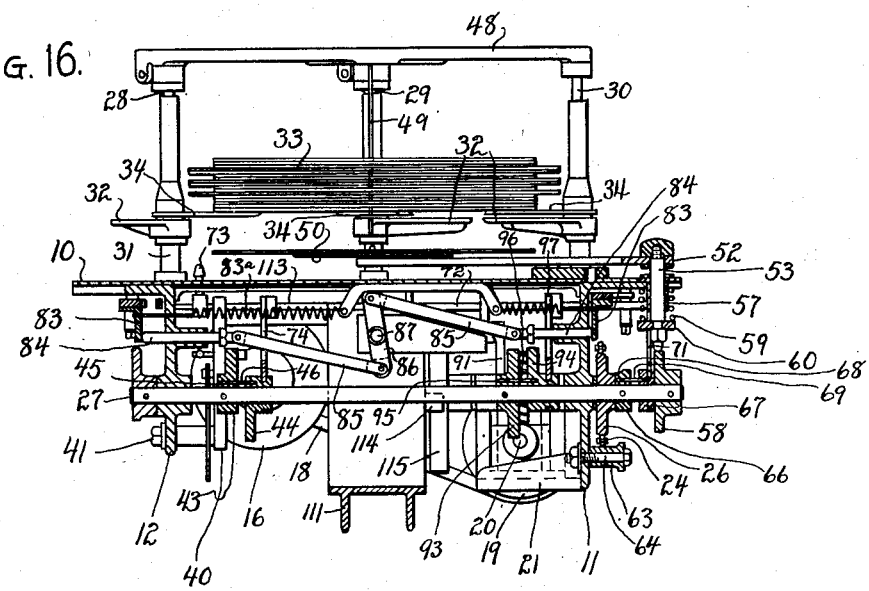
Fig. 16 is a transverse sectional view similar to Fig. 7 but taken on the line 16—16 of Fig. 11.
Figure 17:
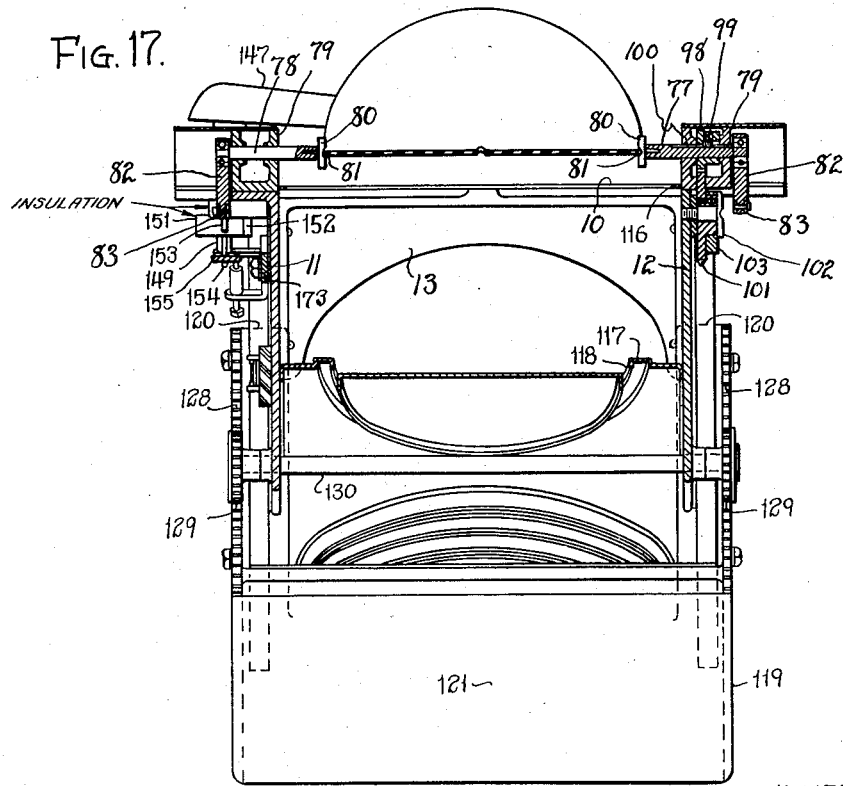
Fig. 17 is a transverse sectional view similar to Fig. 8 but taken on the line 17—17 of Fig. 11.
Figure 20:
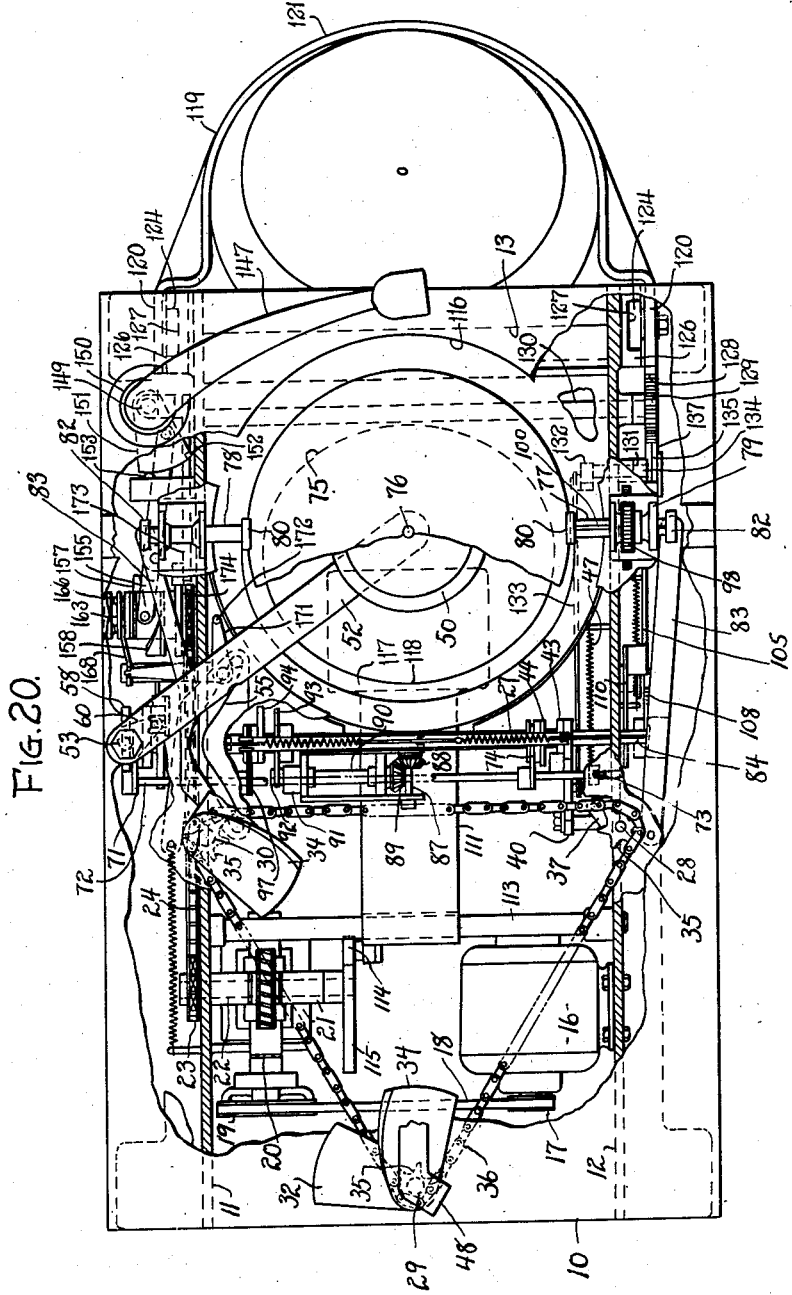

Fig. 19 is a top or plan view similar to Figs. 1 and 11 except that the parts are shown in the positions which they assume after the completion of the playing of the second face of the small-diameter record shown in the preceding figures, and after the said record has been removed from the turntable and the transport-arm has shifted a second small-diameter record into position over the now-retired turntable;

Fig. 20 is a view similar to Figs. 2 and 12 but showing the parts in the same positions as in Fig. 19;

Fig. 21 is a front elevational view similar to Figs. 3 and 13 but showing the parts in the positions in which they are shown in Figs. 19 and 20;

Fig. 22 is a rear elevational view similar to Figs. 4 and 14 but showing the parts in the positions in which they are shown in Figs. 19 to 21 inclusive;

Fig. 23 is a part sectional and part elevational view similar to Figs. 5 and 15 but taken on the line 23—23 of Fig. 19;

Fig. 24 is a transverse sectional view similar to Figs. 7 and 16 but taken on the line 24—24 of Fig. 19;

Fig. 25 is a transverse sectional view similar to Figs. 8 and 17 but taken on the line 25—25 of Fig. 19;

Fig. 26 is a broken view of one of the record-feeding units viewing the same from the direction of the line 26—26 of Fig. 11; and Fig. 27 is a transverse sectional view similar to Figs. 7, 16 and 24 but showing the mechanism set to play but one face of each record in sequence, rather than the playing of each of the respective opposite faces of a record as was the case in the preceding figures.

The particular automatic phonograph chosen for illustration in the accompanying drawings for purposes of making clear one form of the present invention comprises a chassis composed of a multiplicity of pieces rigidly secured together, i. e., a top-plate 10, rear-plate 11, a parallel front-plate 12, and right-end plate 13 located at the right end of the chassis, an intermediate tie-plate 14 extending transversely between the said rear-plate 11 and front-plate 12, and a transverse tie-bar 15 located at the left of the chassis and extending transversely between the rear-plate 11 and front-plate 12.

Rigidly secured to the rear face of the front-plate 12 is an intermittently-operating drive-motor 16 provided with a drive-pulley 17. Extending over the drive-pulley 17 is a belt 18 which also extends over a pulley 19 located adjacent the front face of the rear-plate 11, as is especially well shown in Fig. 2.

The pulley 19 is rigidly mounted upon the input-shaft 20 of a speed-reducing unit generally designated by the reference character 21 and having an output-shaft 22 extending transversely of the chassis-structure and extending at its rear through the rear-plate 11.

At its rear, the output-shaft 22 of the speed-reducing unit 21 is provided with a sprocket 23 over which extends a sprocket-chain 24, as is especially well shown in Fig. 4. The sprocket-chain 24 also extends over a sprocket 25 and a larger-diametered sprocket 26. The sprockets 25 and 26 respectively serve features of the mechanism which will be later described in detail, though it may here be noted that the proportions of the sprockets 23 and 25 are such that a one-to-one ratio exists, while the sprocket 26 is so proportioned as to be turned at one-half the R. P. M. that the sprockets 23 and 25 turn.

The large-diametered sprocket 26 is rigidly attached to the rear portion of a cam-shaft 27 which is journaled adjacent its respective opposite ends in the rear- and front-plates 11 and 12. The said cam-shaft serves to control several features of the automatic phonograph, all in a manner as will be more fully hereinafter described.

For purposes of holding a plurality of records and sequentially feeding the same to a turntable for being played, there is mounted at the left of the chassis three vertical oscillating shafts 28, 29 and 30. Each of the said shafts 28, 29 and 30 extends downwardly through the top-plate 10 and is journaled for oscillating movement in one of three similar bearing-sleeves 31 (Fig. 5) rigidly secured to the upper face of the top-plate 10 and projecting upwardly therefrom.

Rigidly secured to each of the shafts 28, 29 and 30 at a point immediately above their respective bearing-sleeves 31, is one of three similar supporting-arms 32 constructed and arranged to sequentially coact with a plurality of superimposed records generally designated by the reference character 33.

Also mounted on each of the vertical shafts 28, 29 and 30 is one of three corresponding retaining-arms 34 each of which is located above its adjacent supporting-arm 32 and normally extending at an angle with respect thereto, as is indicated in Fig. 1.

Mounted upon the lower end of each of the shafts 28, 29 and 30 below the top-plate 10 is one of three similar sprockets 35, around all three of which extends a sprocket-chain 36 by means of which all three of the supporting-arms 32 are caused to oscillate concurrently along with their respective retaining-arms 34, to drop one record at a time from the bottom of the stack 33, for purposes as will hereinafter appear.

In addition to having a sprocket 35 at its lower end, the shaft 28 is provided with a rigid lever 37 which is provided at its inner end (Fig. 2) with a vertical pin 38. The pin 38 fits between two laterally-spaced-apart horizontal pins 39—39 in the upper end of a lever 40. The said lever is mounted adjacent its lower end for pivotal movement upon a stud 41 projecting rearwardly from the front-plate 12, as is indicated in Fig. 3 and in the lower left portion of Fig. 7.

The lever 40 is provided with a rearwardly-projecting pin 42 which is adapted to coact with the peripheries of either or both of two cams 43 and 44, all in a manner as will more fully hereinafter appear.

The front cam 43 is rigidly secured to the forward portion of the cam-shaft 27 before referred to and, as is indicated in Fig. 7, is provided with a coupling-socket 45 extending in parallelism with the cam-shaft 27 and receiving, with a sliding fit, a coupling-pin 46 rigid with and projecting forwardly from the rear cam 44. In the manner just described, by means of the coupling-socket 45 and the coupling-pin 46, the front cam 43 serves to drive the rear cam 44, while permitting the latter to have axial movement on the cam-shaft 27, into and out of position to engage with the rearwardly-projecting pin 42 on the lever 40, all for purposes as will more fully hereinafter appear. The means for axially shifting the cam 44 into and out of position to engage with the pin 42, will be later described.

The lever 40 is yieldingly urged to swing in a clockwise direction as viewed from the front (Fig. 3) by means of a helical spring 47. The said lever 40 is moved in opposition to the tension of the spring 47 by either or both the front cam 43 and/or the rear cam 44.

Releasably supported upon the respective upper ends of the three oscillating vertical shafts 28, 29 and 30, is a three-armed head-plate 48 having a depending central guide-pin 49 free at its lower end and projecting through the usual central perforation formed in each of the records comprising the stack 33. The said guide-pin 49 serves to centralize the stack of records 33 for being dropped one at a time upon the upper surface of a transporting-disk 50. The said transporting-disk 50 is rigidly mounted upon the upper face of the outer end of a longitudinally-reciprocating slide 51 which is adapted to reciprocate in a lever-arm 52. The said lever-arm 52 is rigidly mounted upon the upper end of a shaft 53.

The slide 51 is provided adjacent its inner end with a depending pin 54 which fits into a cam-slot 55 formed in a cam-plate 56 rigidly secured to the upper face of the top-plate 10, as is shown in Figs. 1 and 2. The cam-slot 55 and the cooperating pin 54 serve to move the slide 51 with respect to the lever-arm 52 in such manner that when the said lever-arm is swung, the transporting-disk 50 will travel in a substantially-straight line along the longitudinal center line of the structure.

The shaft 53 before referred to is mounted with capacity for both transverse turning movement and longitudinal reciprocation vertically in a bearing-sleeve 57 mounted in the top-plate 10 adjacent the rear edge thereof, as is indicated in Fig. 7.

The shaft 53 is vertically raised and lowered for purposes as will hereinafter appear, to similarly move the lever-arm 52, slide 51, and transporting-disk 50, by means of a peripheral cam 58 rigidly mounted upon the rear end of the cam-shaft 27 (Figs. 4, 4a and 7). The lower end of the shaft 53 is adapted to be engaged by the periphery of the cam 58.

As is indicated in the central portion of Fig. 4, a helical spring 59 encircles the bearing-sleeve 57 and thrusts at its respective upper and lower ends against the under face of the top-plate 10 and the upper face of a lever-arm 60 rigidly mounted upon the shaft 53 adjacent the lower end thereof. The said spring 59 serves to maintain the lower end of the shaft 53 in engagement with the periphery of the cam 58 to thus insure the lowering of the said shaft and the parts carried thereby, when the peripheral contours of the cam 58 so permit.

For purposes of swinging the lever-arm 52 to similarly swing the transporting-disk 50, the lever-arm 60 above referred to is provided at its inner end with a vertical pin 61 fitting between two parallel laterally-spaced-apart pins 62—62, as is shown in Figs. 4a and 4b. The said pins 62—62 project rearwardly from the upper end of a lever-arm 63 which is pivotally mounted adjacent the rear-face of the rear-plate 11 upon a stud 64.

Intermediate its respective opposite ends, the lever-arm 63 is provided with a rearwardly-projecting pin 65 which is adapted to be engaged by the peripheries of either or both of two cams 66 and 67, for purposes as will hereinafter appear.

The front cam 66 is rigidly attached to the rear portion of the cam-shaft 26 and, as is indicated in Fig. 7, is provided with a coupling-socket 68 extending in parallelism with the cam-shaft 27. The said coupling-socket receives with a sliding fit, a coupling-pin 69 which is rigid with and projects forwardly from the rear cam 67, which latter is free for sliding movement upon the cam-shaft 27. In the manner just described and by means of the coupling-socket 68 and the coupling-pin 69, the front cam 66 serves to drive the rear cam 67. The sliding engagement of the coupling-pin 69 with the coupling-socket 68 permits the rear cam 67 to have axial movement on the cam-shaft 27, into and out of position to engage with the pin 65 on the lever-arm 63.

The lever-arm 63 is yieldingly urged to turn in the direction required to move its rearwardly-projecting pin 65 toward the cams 66 and 67, by means of a helical spring 70.

For the purpose of axially shifting the rear cam 67 into and out of position for coaction with the pin 65 of the lever-arm 63, the said cam is provided with an annular groove into which extends the lower end of a shifting-arm 71. At its upper end, the shifting-arm 71 is rigidly attached to a shifting-rod 72 extending transversely of the chassis-structure and mounted for reciprocation adjacent its respective front and rear ends in the front- and rear-plates 12 and 11 of the chassis.

Adjacent its forward end and just to the rear of the front-plate 12, the shifting-rod 72 has rigidly connected thereto the lower end of a manually-operable selecting-arm 73. The said selecting-arm extends upwardly through and above the top-plate 10 so as to be available for manipulation from the upper face of the top-plate.

The shifting-rod 72 also has rigidly connected to it the upper end of a shifting-arm 74 which has its lower end (Fig. 7) extended into an annular peripheral groove formed in the cam 44 before referred to, for shifting the same simultaneously with the shifting of the cam 67.

THE RECORD-TURNING MECHANISM

Located to the right of the cam-shaft 27 is a turntable 75 which, together with its driving and operating mechanism, will be more fully hereinafter described.

Upstanding from the center of the turntable 75 is the usual centering-pin 76 adapted to fit into the usual central aperture in a record, to centralize the same on the turntable.

Respectively located to the front and rear of the turntable 75 at diametrically-opposite points with respect to the centering-pin 76, are record-holding plungers 77 and 78. The said plungers are each mounted in suitable bearings 79—79 respectively extending upwardly from the front-plate 12 and the rear-plate 11, as is clearly indicated in Fig. 8.

The record-holding plungers 77 and 78 are mounted in their respective bearings 79—79 with capacity for both axial reciprocation and transverse rotary movement, for purposes as will hereinafter appear. At its inner end, each of the plungers 77 and 78 is provided with a disk-like head 80 facing in opposition to the complemental head on the opposite side of the turntable 75. Each head 80 is formed in its inner face with a holding-groove 81 normally extending in parallelism with the face of the turntable 75, and adapted to receive the adjacent edge of a record, for purposes as will hereinafter appear.

Each of the record-holding plungers 77 and 78 (Fig. 8) has mounted upon its outer end the upper end of one of two similar arms 82—82. The arm 82 of a given plunger 77 or 78 is coupled to the said plunger against movement in an axial direction, but with freedom for relative rotation and is designed to effect the axial movement of its complemental record-holding plunger, in a manner as will presently appear.

Pivotally connected to the lower end of each of the arms 82—82 is the right end of one of two similar levers 83—83 (Figs. 2 and 3). Each of the said levers is pivoted at its left end to adjacent portions of the chassis for movement in a substantially horizontal plane. The two oppositely-located levers 83—83 are yieldingly urged to swing their right ends inwardly to similarly move the record-holding plungers 77 and 78 by means of suitable springs 83a—83a, as is shown in Fig. 7.

Bearing against the inner face of each of the levers 83—83 above referred to is one of two similar plungers 84—84 mounted for reciprocation in a direction transverse of the chassis in any suitable manner, and each having pivotally connected to its inner end one of two similar links 85—85, as is especially well shown in Fig. 7. At their respective inner ends, the links 85—85 are respectively connected to the lower and upper ends of a lever 86 which is rigidly secured intermediate its respective opposite ends to a short shaft 87 which is suitably supported for turning movement in the chassis-structure and which extends lengthwise of the said structure.

The short shaft 87 above referred to (Fig. 2) has rigidly mounted upon its left end a bevel-gear 88 which is meshed into and driven by a bevel-gear 89 rigidly mounted upon the forward end of a shaft 90 extending transversely of the chassis-structure.

By reference to Fig. 2 it will be seen that the shaft 90 has rigidly mounted upon its rear end an arm 91 which projects downwardly as is indicated in Fig. 7, and is provided at its lower end with a roller 92 which is adapted to engage the periphery of either or both of two cams 93 and 94 under circumstances as will hereinafter appear.

The front cam 93 of the pair which also includes the cam 94, is rigidly mounted upon the cam-shaft 27 before referred to. The front cam 93 is provided with a coupling-socket 95 (Fig. 7) extending in parallelism with the cam-shaft 27 and receiving with a sliding fit, a coupling-pin 96 projecting forwardly from the rear cam 94 and rigidly mounted in the latter. In the manner just described and by means of the coupling-socket 95 and coupling-pin 96, the front cam 93 serves to drive the rear cam 94 while permitting the said rear cam to slide in an axial direction upon the cam-shaft 27 into and out of position to engage with the roller 92 on the arm 91, all for purposes as will more fully hereinafter appear.

For purposes of axially shifting the rear cam 94 on the cam-shaft 27, a shifting-arm 97 is employed. At its upper end the said shifting-arm is rigidly connected to the shifting-rod 72. At its lower end the shifting-arm 97 fits into an annular groove formed in the periphery of the hub of the rear cam 94.

The mechanism above described is adapted to effect the axial movement of the record-holding plungers 77 and 78, and it is now proposed to describe the mode of effecting the rotary movement of the front record-holding plunger 77. It may be explained in this connection that it is only necessary to effect the rotation of one of the record-holding plungers, since under operating conditions it will be coupled to the other record-holding plunger by the record which will be gripped between the two said plungers.

For the purpose of effecting the turning movement of the front record-holding plunger 77, the latter has mounted upon it a pinion 98 (Fig. 8) provided with an inwardly-projecting coupling-pin 99 extending into a longitudinal keyway 100 formed in the periphery of the plunger 77.

The inter-engagement of the coupling-pin 99 with the keyway 100 as above described serves to enable the pinion 98 to effect the rotation of the record-holding plunger 77 while permitting the said plunger to move axially with respect to the said pinion.

Meshing into the lower portion of the periphery of the pinion 98 above referred to, is a gear-wheel 101, as is especially well shown in Fig. 3. The said gear-wheel 101 is mounted for turning to the front of the front-plate 12 upon a stud 102.

Mounted for turning movement on the hub of the gear-wheel 101 (Fig. 8) is a ratchet-arm 103 to the outer end of which is pivoted a pawl 104 having its nose engaging with the teeth of the said gear-wheel 101, for purposes of advancing the same in step-by-step motion in a counter-clockwise direction as viewed in Fig. 3. Pivotally connected to the ratchet-arm 103 adjacent the lower or outer end thereof, is a link 105 which is pivotally connected intermediate its respective opposite ends to the upper end of a vertical lever 106 which latter, in turn, is pivoted at its lower end to the front face of the front-plate 12, as is especially well shown in Fig. 3.

Intermediate its respective opposite ends, the lever 106 above referred to is provided with a roller 107 which is adapted to engage with the periphery of a record-turning cam 108 rigidly mounted upon the front end of the cam-shaft 27 in a position in front of the front-plate 12. The lever 106 is yieldingly urged to swing in the direction to engage its roller 107 with the periphery of the cam 108 by means of a helical spring 109 (Fig. 3), which is connected at one end to the link 105 and at its opposite end to the front-plate 12.

For the purpose of preventing (when desired) the retirement of the link 105 from right to left (as viewed in Fig. 3) under the urge of the spring 109, the said link is formed with a stop-arm 110 adapted to engage with the adjacent end of the shifting-rod 72 when the same has been slid forwardly by means of the manually-operable selecting-arm 73.

Returning now to the turntable 73, it will be noted by reference to Figs. 5 and 15 in particular that the said turntable is mounted for rotation upon the right or outer end of a vertically-swinging bracket-arm 111 and is rotated in a conventional manner by means of a drive-motor 112 also carried by the outer portion of the bracket-arm 111.

At its left end the bracket-arm 111 is rigidly mounted upon a trunnion-shaft 113 bearing at its respective opposite ends in the front- and rear-plates 12 and 11 of the chassis, as is especially well shown in Fig. 2. Adjacent its rear edge, the bracket-arm 111 is provided with a roller 114 (Fig. 5) engaging with the periphery of a cam 115 rigidly mounted upon the forward end of the output-shaft 22 of the speed-reducing unit 21 before described.

The revolution of the cam 115 is adapted to swing the bracket-arm 111 and the parts carried thereby down and up between the positions indicated in Fig. 5 and in Fig. 15, all for purposes as will more fully hereinafter appear.

The top-plate 10 is formed adjacent its right end with a clearance-opening 116 located concentrically with the turntable 75 when the same is in its raised position, as shown in Figs. 1 to 5 inclusive. The said clearance-opening is of a size sufficient to permit the said turntable to retire downwardly therethrough, together with the largest-size record intended to be handled (normally 12 inch), into the position especially well illustrated in Figs. 15 and 23. Located beneath the clearance-opening 116 in the top-plate 10 is a record-chute 117 secured in any suitable manner at its respective rear and front edges to the rear-plate 11 and the front-plate 12, respectively.

The record-chute 117 throughout the major portion of its length, is inclined downwardly and to the right, as is especially well shown in Figs. 5, 15 and 23, and is formed with a central clearance-opening 118 positioned and sized to receive the turntable 75 when the same is lowered into the position illustrated in Figs. 15 and 23, but of insufficient size to permit the smallest record (normally 10 inch) to pass through the said clearance-opening.

Secured to the right of the structure, with capacity for vertical movement with respect thereto, is a record-receiving magazine generally designated by the reference character 119 having two side-arms 120—120 extending into position to respectively overlap the rear face of the rear-plate 11 and the front face of the front-plate 12. The said magazine also includes an outer-end wall 121 and a bottom wall 122, which latter is inclined downwardly and to the right at substantially the same angle as the inclination of the record-chute 117. Preferably and as shown in Figs. 5, 15 and 23, the magazine 119 is provided with a suitable resilient lining 123 formed of sponge rubber or other equivalent material which will shield records from damage.

Mounted to the inner face of each of the side-arms 120—120 of the magazine 119 is a pair of antifriction rollers respectively designated by the reference characters 124 and 125 mounted one above the other in the order named, as is indicated in Figs. 3, 4, 13, 14, 21 and 22.

Secured to the rear face of the rear-plate 11 is a vertical track-member 126 formed with a vertical guideway 127 which opens rearwardly and receives the respective upper and lower rollers 124 and 125 on the rear side-arm 120 of the magazine 119. Similarly, a corresponding track-member 126 is secured to the front face of the front-plate 12 adjacent the right end thereof. The last-mentioned track-member 126 corresponds to the other previously mentioned, and like the same, is provided with a guideway 127 which opens, however, forwardly in this instance, and receives the respective upper and lower rollers 124 and 125 carried by the front side-arm 120 of the magazine 119.

By means of the two pairs of rollers 124 and 125 and the complemental track-members 126, the magazine 119 together with its content of records, is capable of vertical movement with respect to the remainder of the structure.

The inner edge of each of the side-arms 120—120 of the magazine 119 is cut to provide a vertical rack 128 which is meshed into by one of two similar pinions 129—129 respectively rigidly mounted upon the front and rear ends of a shaft 130 journaled in the rear- and front-plates 11 and 12.

Located adjacent the forward end of the shaft 130 above referred to and extending in parallelism therewith, is a short shaft 131 which is journaled in the front-plate 12 of the chassis, as is especially well shown in Figs. 3a and 3b. At its rear end, the shaft 131 has rigidly mounted thereon a lever 132 which has pivotally connected to its lower end a link 133. The left end of the link 133 is pivotally connected to the substantially-vertical lever 40 before described and at a point intermediate the upper and lower ends of the said lever 40, as is indicated in Figs. 3, 13 and 21. The lever 132 and the link 133 are both located to the rear of the front-plate 12, as will be apparent by reference to Figs. 3a and 3b.

Rigidly mounted upon the shaft 131 at a point immediately forwardly of the front-plate 12 is a lever 134 which has pivotally connected to its upper end the left end of a magazine-lowering pawl 135 having its right end adapted for engagement with the teeth of the adjacent pinion 129. The said pawl is yieldingly urged into engagement with the pinion 129 by means of a spring 136.

Pivotally mounted upon the short shaft 131 at a location just forwardly of the lever 134, is the left end of a retaining-pawl 137 having its right end adapted to engage with the teeth of the adjacent pinion 129 to normally hold the said pinion against accidental rotation in the direction which would lower the magazine 119. The said retaining-pawl is automatically releasable from engagement with the said pinion 129 in a manner as will hereinafter appear. The retaining-pawl 137 is pivoted upon the short shaft 131 with capacity for swinging movement with respect thereto and is yieldingly urged to swing away from engagement with the pinion 129 by means of a spring 138. Inasmuch as the spring 138 tends to disengage the free end of the retaining-pawl 137 from the pinion 129 as just described, it may here be noted that normally the tension of the front pinion 120 against the free end of the pawl 137 will prevent its retirement until such time as this tension is relieved by a slight left-to-right movement of the pawl 135, all in a manner as will be hereinafter described.

Also mounted upon the forward portion of the short shaft 131 above referred to and at a point forwardly of the magazine-lowering pawl 135, is a double-armed pawl-controlling lever 139 (Figs. 3a and 3b) which is free to turn with respect to the shaft 131. The said lever 139 is provided with an upper arm 140 and a lower arm 141, with the former arm formed with a cam-surface 142.

The pawl-controlling lever 139 is yieldingly urged to turn in a clockwise direction by means of a helical spring 143 and is limited in its turning movement in the direction referred to by a stop-pin 144 projecting outwardly from the front-plate 12.

The cam-surface 142 of the upper arm 140 of the lever 139 is adapted to be engaged by a pin or other suitable abutment 145 projecting outwardly from the magazine-lowering pawl 135 intermediate the respective opposite ends thereof. The lower arm 141 of the lever 139 is adapted to have its upper edge engage with a pin 146 projecting outwardly from the retaining-pawl 137 at a point intermediate the respective opposite ends thereof. The operation of the automatic mechanism just described and which is designed to effect the automatic lowering of the record-receiving magazine 119 will be later described in connection with the general description of the operation of the entire apparatus.

Mounted adjacent the right rear corner of the top-plate 10 with capacity for both horizontal swinging movement and vertical movement is a reproducer-arm 147 which may carry at its outer end a needle or jewel 148 which is adapted to engage with a record mounted upon the turntable 75, in a manner as will be hereinafter described. The rear end of the reproducer-arm 147 has rigidly depending from it a shaft 149 which is adapted to both turn and vertically reciprocate in a bearing 150 carried by the top-plate 10.

Adjacent its lower end the shaft 149 has rigidly connected thereto a switch-arm 151 formed of insulating material and carrying at its inner corner a contact 152 (Fig. 10), which is adapted to engage with and disengage from a contact 153 carried by, but insulated from, the top-plate 10, as is indicated in Figs. 4, 14 and 22. The electrical connections of the contacts 152 and 153 as well as of other electrical features of the mechanism, are schematically shown in Fig. 10.

Extending downwardly from the insulating switch-arm 151 of the shaft 149 is a pin 154 extending through the adjacent end of a lever 155 located adjacent the rear face of the rear plate 11, and pivoted intermediate its respective opposite ends to the said plate 11. The end of the lever 155 opposite the pin 154 is provided with a depending pin 156 which extends between (Figs. 9 and 18) two laterally-spaced-apart face-cams 157 and 158. The front face-cam 158 is rigidly mounted upon a relatively long sleeve 159 which in turn rotates upon a stud 160 projecting rearwardly from the rear plate 11, as is shown in Figs. 9 and 18. The sleeve 159 is rigidly coupled to and driven by the sprocket 25 which has been previously described and which is driven by the sprocket-chain 24.

The rear cam 157 is mounted with freedom for axial movement upon the sleeve 159 and carries a driving-pin 161 projecting forwardly into a socket 162 formed in the front cam 158 and slidably receiving the said driving-pin 161. The rear cam 157, while coupled as described for concurrent rotation with the front cam 158, is free for slight movement in an axial direction between the position in which it is shown by full lines in Fig. 9 and the position in which it is shown by broken lines in Fig. 9. Suitable spring-means such as the helical spring 162a shown in Figs. 9 and 18 serve to yieldingly urge the rear cam 157 to move rearwardly in an axial direction.

For the purpose of shifting the rear cam 157 forwardly, a plate-like cam-shifting member 163 is mounted upon the rear end of the sleeve 159 with freedom for turning movement thereon. The said cam-shifting member 163 is provided with a suitable number of rearwardly-projecting tapered studs 164 which are adapted to engage with a similar number of forwardly-extending tapered studs 165 rigidly mounted in a collar 166. The collar 166 is rigidly mounted upon the rear end of the stud 160 which projects rearwardly from the rear plate 11, as is especially well shown in Figs. 9 and 18.

The plate-like cam-shifting member 163 is provided with a radially-extending arm 167 to which is pivoted one end of a link 168, as is shown in Figs. 4, 14 and 22. The other end of the link 168 is pivotally connected to the lower end of a lever 169 and the upper end of a lever 170. The lower end of the lever 170 projects into the path of movement of either or both (depending on their relative axial position) of the two cams 66 and 67 previously described and which are mounted on the projecting rear portion of the cam-shaft 27. It may here be noted as before described, the rear cam 67 while turnable concurrently with the cam 66 is axially movable relative thereto so that when shifted forwardly it, like the cam 66, will engage with the end of the lever 170, but when shifted rearwardly will not engage therewith, all for purposes as will hereinafter appear.

The lever 169 above referred to is pivoted intermediate its respective upper and lower ends to the rear plate 11, as is indicated in Figs. 4, 14 and 22. The upper end of the lever 169 is articulately connected to the projecting rear arm of a bell-crank lever 171 which latter is pivoted to the under face of the top-plate 10 for swinging movement in a horizontal plane, as is indicated in Figs. 2, 12 and 20. The inner arm of the said bell-crank lever 171 projects to the right and carries a control-pin 172 which projects upwardly through a suitable clearance-opening in the top-plate 10 into a position wherein the edge of a large-diametered record will strike and retire the said control-pin rearwardly as such large-diametered record is moved from left to right by the transporting-disk 50.

For purposes of raising and lowering the reproducer-arm 147, a lever 173 is employed. The said lever is pivoted intermediate its respective opposite ends to the rear face of the rear-plate 11 for swinging movement in a vertical plane. The inner end of the said lever 173 is positioned to be engaged by a reproducer-lifting cam 174 which is rigidly mounted upon the forward portion of the sleeve 159 (Figs. 9 and 18) so as to rotate in unison with the said sleeve and with the face-cams 157 and 158 before described. The reproducer-lifting cam 174 is so shaped as to act through the intermediary of the lever 173 to lift the reproducer-arm 147 and the parts assembled therewith once for each revolution of the sleeve 159 and its drive-sprocket 25.

The electric drive-motor 16 before referred to is intermittently energized under the control of the switch-mechanism comprising the contacts 152 and 153, a manually-operable main-switch 175, a manually-operable record-rejecting switch 176 and a double-throw switch generally designated by the reference character 177. The switches just referred to, together with the drive-motor 16 and the turntable-motor 112 are schematically shown with the various electrical connections in Fig. 10.

The double-throw switch 177 above referred to is secured to the rear face of the rear-plate 11 as is indicated in Figs. 4, 14 and 22, and has an operating-plunger 178 extending upwardly into position to be sprung downwardly by the periphery of the front face-cam 158 previously described and especially well shown in Figs. 9 and 18. The said face-cam is formed in its periphery with a clearance-notch 179 which permits the operating-plunger 178 to rise sufficiently to permit the swinging contact-arm of the said switch 177 to engage with the upper fixed contact, as will be apparent by reference to Fig. 10. The periphery of the front face-cam 158 is circular with the exception of the clearance-notch 179 so that during the major portion of the movement of the said cam, the contact-arm of the said switch 177 will be held down in engagement with the lower fixed contact.

OPERATION

The playing of the respective opposite faces of each record

With the parts in the positions indicated in Figs. 1 to 9 inclusive, a small-diametered record is in progress of having its first face played while the transporting-disk 50 is beneath the stack of records 33 in readiness, when required, to receive and transport another small-diametered record to the turntable 75. The main-switch 175 may be assumed to be in its "closed" position to thus energize the drive-motor 112, so as to continuously rotate the turntable 75 until such time as the said main-switch is moved into its "off" position, the drive-motor 16 being at this time idle.

Under the conditions above described, the playing of the first face of the record shown on the turntable 75 will continue until the outer end of the reproducer-arm 147 has been swung inwardly by the coaction of the needle 148 with the groove in the record, to complete the playing of the said first face of the record and to engage the contact 152 on the switch-arm 151 of the said reproducer-arm with the stationary contact 153.

As soon as the engagement above referred to takes place, the circuit through the drive-motor 16 will be closed to start the said drive-motor in operation. The starting of the drive-motor 16 as above described, will rotate the output-shaft 22 and, through the intermediary of the sprocket-chain 24, will drive the cam-shaft 27, the sleeve 159 and the parts 157, 158 and 174 driven by the said sleeve.

As soon as the sleeve 159 starts to rotate, the reproducer-lifting cam 174 thereon will rock the lever 173 in a clockwise direction (as viewed in Fig. 4) and thus cause the said lever to lift the vertical shaft 149 of the reproducer-arm 147, together with the parts assembled with the said shaft, including the reproducer-arm 147.

Immediately following the lifting of the reproducer-arm 147 as above described, the face-cam 158 on the sleeve 159 will engage with the pin 156 on the end of the lever 155 and swing the same so that the said lever acts through the intermediary of the pin 154 and the insulating switch-arm 151, to turn the reproducer-arm 147 into its retired position, as shown in Figs. 11 and 19.

Coincidentally with the start of the initial lifting movement of the reproducer-arm 147, the periphery of the face-cam 158 will depress the operating-plunger 178 of the double-throw switch 177 and shift the said switch 177 from the position in which it is indicated by full lines in Fig. 10 into the position in which it is indicated by broken lines in the same figure, so that when the moving contact 152 (which moves with the reproducer-arm 147) breaks engagement with the contact 153, the double-throw switch 177 will be in position to continue a supply of current to the drive-motor 16 independently of the contacts 152 and 153.

Also coincidentally with the described upward movement of the reproducer-arm 147, the cam 43 (its companion cam 44 being at this time in its inoperative position) will rock the lever 40 (Fig. 3) and cause the latter to swing the lever 37 in a counterclockwise direction, as viewed in Fig. 2. The described turning movement of the lever 37 will turn the vertical shaft 28 and its sprocket 35 in a similar direction. The sprocket-chain 36 will then cause the remaining two vertical shafts 29 and 30 to similarly turn. The simultaneous turning of the vertical shafts 28, 29 and 30 will similarly swing all three of the supporting-arms 32 from beneath the lowermost record of the stack 33 to drop the said record onto the transporting-disk 50. While the said retaining-fingers are moving out from under the lowermost record, the supporting-arms 32 will swing in beneath the record next above to thus hold back the stack 33.

Immediately following the start of the upward movement of the reproducer-arm 147 as above described, the cam 93 on the cam-shaft 27 will act (the companion cam 94 being at the time retired) through the train of parts 82 to 92 inclusive, to permit the springs 83a to move the record-holding plungers 77 and 78 inwardly so that the respective holding-grooves 81 of the said plungers will fit over the edge of the record which is at the time on the turntable 75.

Substantially as soon as the plungers 77 and 78 engage with the record as above described, the now-rotating cam 115 (Fig. 5) will act to permit the bracket-arm 111 to swing downwardly into the position shown in Fig. 15, and thus retire the turntable 75 clear of the record previously held on the latter.

During the time that the reproducer-arm 147 is being lifted and retired as above described, the now-rotating record-turning cam 108 will have permitted the roller 107 of the lever 106 (Figs. 3, 13 and 21) to drop into its peripheral notch in the cam 108 under the urge of the spring 109 thereby swinging the pawl 104 idly back over the teeth of the gear-wheel 101 preparatory to a fresh thrust on the said gear-wheel.

The timing of the cam 108 is such that substantially as soon as the record-turning plungers 77 and 78 are engaged with the edge of the record, and while the turntable 75 is being swung downwardly, all as above described, the said cam 108 will act through the chain of parts 107, 106, 105 and 103 to cause the pawl 104 to turn the gear-wheel 101 and pinion 98 to thus positively turn the record-turning plunger 77. The turning of the record-turning plunger 77 will, through the intermediary of the record itself, also turn the complemental record-turning plunger 78 which record is shown in progress of being turned in Figs. 11 to 15 inclusive and Fig. 17.

During the lowering of the turntable 75 and the turning of the record, the transporting-disk 50 together with the record thereon, will remain stationary beneath the stack of records 33, since the cam 67 (which would otherwise function at this time) is retired axially rearwardly so as not to engage with the pin 65 of the lever 63 (Figs. 4a and 4b).

Shortly after the record just gripped by the plungers 77 and 78 has been turned sufficiently to reach substantial-verticality in it progress of being turned over, the cam 115 will start to again swing the bracket-arm 111 upwardly to thereby restore the turntable 75 to the position in which it is shown in Figs. 1 to 8 inclusive. The upward movement of the turntable will be completed shortly after the record just being turned, has been completely turned over so that the centering-pin 76 of the turntable may re-enter the central opening in the said record.

As soon as the turntable 75 has been moved up as just described to re-engage with the now turned-over record, the record-holding plungers 77 and 78 will be retired out of engagement with the record.

As the record-holding plungers are retiring as above described, the reproducer-arm 147 will be swung inwardly the required distance to start the playing of the second face of the small-diametered record which has just been reversed, and will be lowered so as to bring its needle 148 into engagement with the said record. The inward swinging movement of the reproducer-arm as just described will be effected by the contour of the inner or front face of the face-cam 157, while the lowering movement of the said reproducer-arm will be effected by the periphery of the cam 174.

Shortly after the reproducer-arm 147 has had its needle 148 engaged with the second face of the record, the notch 179 in the periphery of the face-cam 158 will again come into registry with the operating-plunger 178 of the double-throw switch 177 and thereby permit the said switch to reassume the position in which it is indicated by full lines in Fig. 10. This movement of the switch 177 will deprive the drive-motor 16 of its current supply thereby bringing the mechanism to a stop save for the drive-motor 112 which will continue as before to drive the said turntable and the record carried thereby. It may here be noted that as long as the main switch 175 is closed, the drive-motor 112 of the turntable 75 will continue to operate even throughout the rise and fall of the said turntable as before described.

As above described, the second face of the original small-diametered record is in the course of being played. Under these conditions, ultimately the outer end of the reproducer-arm 147 will be swung inwardly by the coaction of the needle 148 with the groove in the second face of the said record. When the playing of the second face of the record is completed the contact 152, which is moved in consonance with the movement of the reproducer-arm 147, will again engage with the contact 153. As soon as the contact 152 engages with the stationary contact 153 as just described, the circuit through the drive-motor 16 will again be established so that the said drive-motor will start in operation.

The starting up of the drive-motor 16 as above described, will rotate the output-shaft 22, the cam-shaft 27, the sleeve 159 and the parts 157, 158 and 174 driven by the said sleeve. It may here be noted that the said drive-motor 16 will not be again shut down until after it has imparted a full revolution to the output-shaft 22 and the sleeve 159 while coincidentally imparting but a one-half revolution to the cam-shaft 27 and the parts carried thereby.

As soon as the sleeve 159 starts to rotate the reproducer-arm 147 will be again lifted off of the record and swung outwardly into its retired position, as illustrated in Figs. 19 to 23 inclusive, by means of the mechanism and in the manner previously described.

In connection with the description of the previous cycle of the turning-over of the first record, the record-holding plungers 77 and 78 move inwardly to grip the record preparatory to turning the same over. Under the present circumstances however, the second face of the first record has just been played and the record-holding plungers 77 and 78 will not at this time move inwardly to engage the said record. This omission of the inward movement of the said record-holding plungers 77 and 78 will be occasioned by the contours of the cam 93 which has previously revolved only one-half revolution as compared to a full revolution of the output-shaft 22 and the sleeve 159.

While the record-holding plungers 77 and 78 are still in their retired positions, the cam 115 will act to permit the bracket-arm 111 to swing downwardly and thus lower the turntable 75 into the position in which it is shown in Fig. 23. The record which has just had its second face played will also descend with the turntable. Just before the turntable 75 reaches its fully retired position, as is shown in Fig. 23, the under face of the record just lowered with the said turntable, will engage with the upper surface of the record-chute 117 in the areas around the clearance-opening 118 therein. As soon as the turntable 75 has retired sufficiently to disengage its centering-pin 76 from the hole in the center of the said record, the record in question will slide down the record-chute 117 onto the topmost of the pile of records previously in the record-receiving magazine 119.

Substantially as soon as the turntable 75 starts to lower as above described, the transporting-disk 50, together with another small-diametered record thereon, will be swung toward the position in which the said transporting-disk is shown in Figs. 19 to 23 inclusive, by the action of the cam 66 (Figs. 4a and 4b) since the companion cam 67 is at this time retired out of its operative position.

As soon as the transporting-disk 50 has been swung over into the position in which it is shown in Figs. 19 to 23 inclusive, the cam 93 (the complemental cam 94 being at this time retired) will cause the record-holding plungers 77 and 78 to move inwardly and engage themselves with the respective opposite edges of the newly-transported small-diametered record now held on the transporting-disk 50.

Immediately following the above described engagement of the record-holding plungers 77 and 78 with the newly-transported record, the transporting-disk 50 and the parts by which it is carried will be lowered sufficiently to completely disengage the transporting-disk 50 from the said record. The dropping movement of the transporting-disk just described will be effected by the peripheral contour of the cam 58 (Figs. 4, 14 and 22).

As soon as the transporting-disk 50 has been lowered as just above described, it will be swung back into a position centrally beneath the stack of records 33 while the turntable 75 is being raised by the cam 115.

In due course, the turntable 75 will engage with the under surface of the second small-diametered record now being held by the record-holding plungers 77 and 78 and will enter its centering-pin 76 into the usual central opening in the said record.

As soon as the turntable 75 has been re-engaged with the record and its centering-pin 76 has been re-entered into the opening in the said record as just above described, the record-holding plungers 77 and 78 will retire out of engagement with the edge of the said record. The reproducer-arm 147 will now be swung inwardly the appropriate distance for the start of a small-diametered record and will be lowered into engagement with the latter. The first face of this second record will then be played and when such playing is completed, the said record will be turned over in the manner previously described for the first record and its second face played, and so on in repeated cycles.

*The playing of but one face of each record*

To set the mechanism previously described to so function that but one face of each record is played, the shifting-rod 72 will be slid forwardly by means of the manually-operable selecting-arm 73 (Figs. 1, 11 and 19). The forward movement of the shifting-rod 72 will similarly shift all of the cams 44, 67 and 94 so that they are respectively closely adjacent their complemental cams 43, 66 and 93. The movement just described will shift the cams referred to from the positions in which they are shown in Figs. 7, 16 and 24 into the positions in which they are shown in Fig. 27.

With the parts positioned as above described, as soon as the upper face of a given record has been played completely, the turntable 75 will be caused to swing downwardly and thus deposit the just-played record on the upper surface of the record-chute 117 for conveyance into the record-receiving magazine 119.

During the lowering of the turntable 75 with its record as just described, the transport-disk 50 with a fresh record will swing over from beneath the stack of records 33 into a position directly over the now-depressed turntable 75.

As soon as the transporting-disk 50 brings a fresh record over as just above described, the record-holding plungers 77 and 78 will move in and engage the opposite edges of the said record, whereupon the transporting-disk will be lowered and swung backwardly to a position beneath the stack of records 33. As the transporting-disk 50 swings backward as just described, the turntable 75 will be rising and will engage with the fresh record just transported and held by the record-holding plungers 77 and 78, whereupon the said record-holding plungers will automatically retire and the reproducer-arm 147 will be engaged with the record to play its upper face.

Upon the completion of the playing of the record now on the turntable 75, the drive-motor 16 will be started in the manner before described, and the reproducer-arm 147 will be raised and swung outwardly into its retired position and the turntable will be swung downwardly and the phases of the cycle previously referred to will be repeated as long as the supply of records is present in the stack 33, and as long as the shifting-rod 72 is maintained in its forward position, as shown in Fig. 27.

Each time that the reproducer-arm 147 is raised, the supporting-arms 32 and retaining-arms 34 will be swung so that still another record is dropped upon the upper surface of the said transporting-disk for transportation thereby to the turntable 75.

*The playing of mixed small-dimetered and large-diametered records*

Normally, the control-pin 172 is located in its closest position toward the turntable 75, as is shown in Figs. 1, 2, 11, 12, 19 and 20, in which position it will not be engaged by the edge of small-diametered records being successively transported to a position over the turntable 75. If, however, a large-diametered record (usually 12-inch) should be transported by the transporting-disk 50, the edge of such large-diametered record will engage with the control-pin 172 and force the same rearwardly. The rearward movement of the control-pin 172 will swing the bell-crank lever 171 (Figs. 2, 12 and 20) in a counterclockwise direction. The counterclockwise swinging movement just referred to will swing the levers 169 and 170 from the positions in which they are shown by full lines in Fig. 4b into the positions in which they are shown by broken lines in the same figure. The swinging movement of the said levers 169 and 170 causes a push on the link 168 (from right to left as viewed in Figs. 4 and 4b), thereby rocking the plate-like cam-shifting member 163 in a counterclockwise direction (as viewed in Fig. 4) to thus move its studs 164 out of registry with the studs 165 of the collar 166. This movement out of registry will permit the springs 162a to shift the cam 157 rearwardly a slight distance, as is indicated by broken lines in Fig. 9.

Now, when the cam 157 is again called upon to swing the reproducer-arm 147 inwardly, the said cam will not swing the reproducer-arm as far inwardly as had previously been the case. This lesser swinging movement of the reproducer-arm is designed to register the needle 148 therefore with the start of the groove in the larger-diametered record just placed on the turntable 75.

Sufficiently before the start of the next succeeding record-transporting movement of the transporting-disk 50, either or both the cams 66 or 67 (Fig. 4b) will engage with the lower arm of the lever 170 to thus swing the said lever and its companion lever 169 from the positions in which they are shown by broken lines in Fig. 4b back into the positions in which they are shown by full lines in the same figure. The described swinging movement of the levers 169 and 170 will in turn swing the bell-crank lever 171 so as to place the control-pin 172 of the latter in position to be engaged by the edge of a large-diametered record, should such a record be the next record to be transported by the transporting-disk 50. If the next record transported by the transporting-disk 50 should be a small-diametered record, the edge of such record will not strike the control-pin 172 and the levers 169 and 170 will remain in the positions in which they are shown in Fig. 4b, thereby leaving the studs 164 in engagement with the studs 165, in the manner indicated in Figs. 9 and 18, to thereby provide for the movement of the reproducer-arm into registry with the start of the groove in a small-diametered record.

*The lowering of the record-receiving magazine*

As described in the forepart of this specification, the bottom wall 122 of the record-receiving magazine 119 is mounted for vertical movement in order that records sequentially sliding thereinto from the record-chute 117 will not have to drop a great distance with possible consequent damage.

The mechanism of the automatic phonograph above described is so designed that shortly after a just-played record is deposited in the record-receiving magazine 119, the bottom wall 122 thereof automatically lowers a distance approximating the thickness of the average record.

The lowering of the bottom wall 122 as above referred to, is effected by the action of the front cam 43 alone (when the mechanism is said to play both sides of a record) or by both the cam 43 and the companion cam 44 (when the mechanism is set to play but one side of each record).

As the cams 43 and 44 turn in a counterclockwise direction (as viewed in Figs. 3, 13 and 21), the lever 40 will be rocked in a counterclockwise direction thus pulling, to a slight degree, on the link 133.

The slight pulling movement on the link 133 as above described will cause the lever 132 to rock slightly in a clockwise direction (Fig. 3a) to thus cause the magazine-lowering pawl 135 to slightly turn the pinion 129 in a counterclockwise direction as viewed in Figs. 3 and 3a. This slight counterclockwise turning movement of the pinion 129 will relieve the nose of the retaining-pawl 137 of its previous tight engagement by the said pinion 129 thus permitting the spring 138 to swing the said pawl 137 downwardly into the position in which it is indicated by broken lines in Fig. 3a, and thus completely free of the pinion 129.

As soon as the retaining-pawl 137 moves downwardly clear of the pinion 129 the magazine-lowering pawl 135 will be retired from right to left (as viewed in Figs. 3 and 3a) a distance required to permit the shaft 130 to rotate a distance such as will cause its two pinions 129—129 (on its respective opposite ends) to turn sufficiently in mesh with the racks 128 to lower the bottom wall 122 a distance sufficient to accommodate one additional record when the same is later conveyed into the magazine 119.

As the pawl 135 approaches the limit of its movement from right to left as indicated by broken lines in Fig. 3a, its pin 145 will engage with the substantially-straight upper portion of the upper arm 140 of the pawl-controlling lever 139. The engagement just referred to will rock the said pawl-controlling lever in a counterclockwise direction thus causing the lower arm 141 to engage with the pin 146 to forcibly raise the retaining-pawl 137 back into engagement with the adjacent pinion 129 as is shown by full lines in Fig. 3a.

After effecting the raising of the pawl 137, the pin 145 will continue to move from right to left and will ride down the inclined cam-surface 142 of the upper arm 140 of the lever 139 and since the said lever 139 can turn no further in a counterclockwise direction, the engagement just referred to will effect the lowering of the end of the magazine-lowering pawl 135 from engagement with the adjacent pinion 129. The latter disengagement will thus leave gravity free to turn the pinion 129 in a clockwise direction a slight distance sufficient to jam one of its teeth against the end of the retaining-pawl 137 to thus lightly hold the same up in the position indicated by full lines in Fig. 3a. The continued movement of the lever 132 in a clockwise direction will advance the magazine-lowering pawl 135 from left to right before its pin 145 rides out from the arm 140. As soon as the pin 145 rides clear of the arm 140 the pawl 135 will be re-engaged (at a new point) with the pinion 129 in readiness for another cycle.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An automatic phonograph, including in combination: a frame; a bodily-movable record-holding turntable associated with the said frame and designed and adapted to hold and rotate a disk record; record-turning means associated with the said frame and turntable and constructed and arranged to reverse a disk record previously held on the said turntable; a record-receiving magazine associated with the said frame and having a retirable record-holding member; record-guiding means leading into the said magazine; turntable-guiding means associated with the said frame and constructed and arranged to guide the bodily-movable turntable between positions wherein a record carried thereby may be engaged either by the said record-turning means for being reversed or engaged by the said record-guiding means for delivery into the said magazine; operating-means constructed and arranged to move the said turntable between the positions described and to cause the said record-turning means to reverse a record previously held by the said turntable during each alternate cycle of movement of the turntable away from and back toward the said record-turning means and automatic-means coordinated with the said operating-means and retiring the record-holding member of the said magazine in step-by-step movements.

2. An automatic phonograph, including in combination: a frame; a bodily-movable record-holding turntable associated with the said frame and designed and adapted to hold and rotate a disk record in a substantially-horizontal plane; record-turning means associated with the said frame and the turntable and constructed and arranged to reverse a disk record previously held on the said turntable; a record-receiving magazine located below the said record-turning means and having a retirable record-holding member; inclined record-guiding means leading into the said magazine; turntable-guiding means associated with the said frame and constructed and arranged to guide the bodily-movable turntable in a substantially-vertical plane between positions wherein a record carried thereby may be engaged either by the said record-turning means for being reversed or engaged by the said inclined record-guiding means for delivery into the said magazine; operating-means constructed and arranged to move the said turntable between the positions described and to cause the said record-turning means to reverse a record previously held by the said turntable during each alternate cycle of substantially-vertical movement of the turntable away from and back toward the said record-turning means and automatic-means co-ordinated with the said operating-means and retiring the record-holding member of the said magazine in step-by-step movements.

3. An automatic phonograph, including in combination: a frame; a bodily-movable record-holding turntable associated with the said frame and designed and adapted to hold and rotate a disk record in a substantially-horizontal plane; record-turning means associated with the said frame and turntable and constructed and arranged to reverse a disk record previously held on the said turntable; a record-receiving magazine located below the said record-turning means and having a retirable record-holding member; record-guiding means leading into the said magazine; a pivotal turntable-carrying arm pivoted at one end-portion to the said frame and carrying the said bodily-movable turntable adjacent to its other end-portion, the said turntable-carrying arm being constructed and arranged to guide the said turntable in a substantially-vertical direction between positions wherein a record carried by the turntable may be engaged either by the said record-turning means for being reversed or engaged by the said record-guiding means for delivery into the said magazine; operating-means constructed and arranged to swing the said pivotal arm to move the said turntable between the positions described and to cause the said record-turning means to reverse the record previously held by the said turntable during each alternate cycle of substantially-vertical movement of the turntable away from and back toward the said record-turning means and automatic-means co-ordinated with the said operating-means and retiring the record-holding member of the said magazine in step-by-step movements.

RAYMOND SOMMA.

REFERENCES CITED

The following references are of record in the file of this patent:

UNITED STATES PATENTS

| Number | Name | Date |
|---|---|---|
| 1,967,599 | Thompsett et al. | July 24, 1934 |
| 2,097,323 | Hill | Oct. 26, 1937 |
| 2,265,048 | Tsuchiya | Dec. 2, 1941 |
| 2,309,352 | Offen | Jan. 26, 1943 |
| 2,339,062 | Davis et al. | Jan. 11, 1944 |
| 2,352,561 | Offen | June 27, 1944 |
| 2,352,562 | Offen | June 27, 1944 |
| 2,352,563 | Offen | June 27, 1944 |
| 2,378,510 | Brown | June 19, 1945 |
| 2,386,166 | Lissiansky | Oct. 2, 1945 |

FOREIGN PATENTS

| Number | Country | Date |
|---|---|---|
| 328,302 | Great Britain | Apr. 25, 1930 |
| 346,763 | Great Britain | Apr. 14, 1931 |